United States Patent
Abraha et al.

(10) Patent No.: US 11,528,063 B2
(45) Date of Patent: Dec. 13, 2022

(54) SUPPORTING DISTRIBUTED MASSIVE MULTIPLE-INPUT MULTIPLE-OUTPUT (DM-MIMO) IN A DISTRIBUTED COMMUNICATIONS SYSTEM (DCS)

(71) Applicant: Corning Incorporated, Corning, NY (US)

(72) Inventors: Solomon Tesfay Abraha, Corning, NY (US); Qing Ji, Painted Post, NY (US); Xiaojun Liang, Horseheads, NY (US); Anthony Ng'oma, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/531,955

(22) Filed: Nov. 22, 2021

(65) Prior Publication Data
US 2022/0166471 A1  May 26, 2022

Related U.S. Application Data

(60) Provisional application No. 63/118,419, filed on Nov. 25, 2020.

(51) Int. Cl.
*H04B 7/0452* (2017.01)
*H04W 4/02* (2018.01)
(Continued)

(52) U.S. Cl.
CPC ......... *H04B 7/0452* (2013.01); *H04B 7/0426* (2013.01); *H04W 4/025* (2013.01); *H04W 4/06* (2013.01)

(58) Field of Classification Search
CPC .... H04B 7/0452; H04B 7/0426; H04B 7/022; H04B 7/0413; H04W 4/025; H04W 4/06
See application file for complete search history.

(56) References Cited

U.S. PATENT DOCUMENTS 9,166,690 B2 * 10/2015 Brower .............. H04B 10/2575
9,553,639 B2    1/2017 Babaei et al.
(Continued)

FOREIGN PATENT DOCUMENTS

WO    2011/017700 A1    2/2011
WO    2016/115546 A1    7/2016

OTHER PUBLICATIONS

D. Qiao, et al, "Massive MIMO architecture for 5G networks: Co-located or distributed?", Proc. 11th ISWCS, Aug. 2014, pp. 192-197.

(Continued)

*Primary Examiner* — Vineeta S Panwalkar
(74) *Attorney, Agent, or Firm* — William D. Doyle

(57) ABSTRACT

Supporting distributed massive multiple-input multiple-output (DM-MIMO) in a distributed communications system (DCS) is disclosed. The DCS includes multiple remote units each configured to communicate downlink and uplink radio frequency (RF) communications signals with a number of user equipment (UEs) at different UE locations in the DCS. Each remote unit includes multiple antennas, multiple RF chains, and an RF switch circuit configured to dynamically couple the RF chains to a subset of antennas in accordance to the UE locations such that the subset of antennas can be activated to concurrently radiate the downlink RF communications signals and absorb the uplink RF communications signals. By dynamically activating the subset of antennas in accordance to the UE locations, it is possible to optimize signal strength and channel quality for each UE in the DCS, thus making it possible to improve wireless data capacity of the DCS with negligible additional hardware cost.

24 Claims, 15 Drawing Sheets

(51) Int. Cl.
*H04B 7/0426* (2017.01)
*H04W 4/06* (2009.01)

(56) References Cited

U.S. PATENT DOCUMENTS

| | | |
|---|---|---|
| 2006/0019679 A1 | 1/2006 | Rappaport et al. |
| 2014/0307814 A1 | 10/2014 | Jalloul et al. |
| 2015/0038185 A1* | 2/2015 | Saban .................. H04B 1/0075 455/509 |
| 2016/0308589 A1 | 10/2016 | Jalloul et al. |
| 2018/0138951 A1 | 5/2018 | Boudreau et al. |

OTHER PUBLICATIONS

Gao, Xiang, et al., "Antenna selection in measured massive MIMO channels using convex optimization" In Globecom Workshops (GC Wkshps), IEEE, Dec. 2013, pp. 129-134.
Harun Siljak, et al., "Distributing Complexity: A New Approach to Antenna Selection for Distributed Massive MIMO", IEEE Wireless Communications Letters, vol. 7, Issue: May 6, 2018, pp. 902-905.
S. Mahboob, et al., "Transmit antenna selection for downlink transmission in a massively distributed antenna system using convex optimization", Proc. 7th Int. Conf. BWCCA, Nov. 2012, pp. 228-233.
V. Savic, et al, "Fingerprinting-based positioning in distributed massive MIMO systems", IEEE Vehicular Technology Conference, Sep. 2015.

* cited by examiner

| | $C_1$ (LOC$_1$) | $C_2$ (LOC$_2$) | ... | $C_G$ (LOC$_G$) | | $C_N$ (LOC$_N$) |
|---|---|---|---|---|---|---|
| R1 | h11 | h12 | ... | h19 | | h1N |
| R2 | h21 | h22 | ... | h29 | | h2N |
| R3 | h31 | h32 | ... | h39 | | h3N |
| R4 | h41 | h42 | ... | h49 | | h4N |
| R5 | h51 | h52 | ... | h59 | | h5N |
| R6 | h61 | h62 | ... | h69 | | h6N |
| R7 | h71 | h72 | ... | h79 | | h7N |
| R8 | h81 | h82 | ... | h89 | | h8N |
| .. | .. | .. | | .. | | .. |
| R32 | h321 | h322 | | h329 | | h32N |

↑ ESTIMATED UE LOCATION OF UE1  ↑ ESTIMATED UE LOCATION OF UE2

FIG. 7A

| | | | | | | |
|---|---|---|---|---|---|---|
| R1 | h11 | h12 | ... | h19 | | h1N |
| R2 | h21 | h22 | ... | h29 | | h2N |
| R3 | h31 | h32 | ... | h39 | | h3N |
| R4 | h41 | h42 | ... | h49 | | h4N |
| R5 | h51 | h52 | ... | h59 | | h5N |
| R6 | h61 | h62 | ... | h69 | | h6N |
| R7 | h71 | h72 | ... | h79 | | h7N |
| R8 | h81 | h82 | ... | h89 | | h8N |
| .. | .. | .. | | .. | | .. |
| R32 | h321 | h322 | | h329 | | h32N |

↑ ESTIMATED UE LOCATION OF UE1  ↑ ESTIMATED UE LOCATION OF UE2

FIG. 7B

SUPPORTING DISTRIBUTED MASSIVE MULTIPLE-INPUT MULTIPLE-OUTPUT (DM-MIMO) IN A DISTRIBUTED COMMUNICATIONS SYSTEM (DCS)

CROSS-REFERENCE TO RELATED APPLICATIONS

This application claims the benefit of priority under 35 U.S.C. § 119 of U.S. Provisional Application Ser. No. 63/118,419, filed Nov. 25, 2020, the content of which is relied upon and incorporated herein by reference in its entirety.

BACKGROUND

The disclosure relates generally to supporting distributed massive multiple-input multiple-output (DM-MIMO) in a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a DCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the DCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the DCS 100 in FIG. 1 may be configured to support service providers 104(1)-104(N) that have a different frequency spectrum and do not share the spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a DCS, such as a distributed antenna system (DAS), such that the radio circuits 118(1)-118(N) remotely distribute the downlink communications signals 110(1)-110(N) of the multiple service providers 104(1)-104(N) to remote units. The remote units can each include an antenna array that includes tens or even hundreds of antennas for concurrently radiating the downlink communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the downlink communications signals 110(1)-110(N) to subscribers based on a massive multiple-input multiple-output (M-MIMO) scheme.

No admission is made that any reference cited herein constitutes prior art. Applicant expressly reserves the right to challenge the accuracy and pertinency of any cited documents.

SUMMARY

Embodiments disclosed herein include supporting distributed massive multiple-input multiple-output (DM-MIMO) in a distributed communications system (DCS). The DCS includes a number of remote units each configured to communicate downlink and uplink radio frequency (RF) communications signals with a number of user equipment (UEs) at different UE locations in the DCS. Each remote unit includes a number of antennas and a number of RF chains for supporting DM-MIMO. In a non-limiting example, the number of antennas is more than the number of RF chains. As such, only a subset of the antennas may be activated at any given time. In this regard, each remote unit further includes an RF switch circuit configured to dynamically couple the RF chains to the subset of antennas in accordance to the UE locations such that the subset of antennas can be activated to concurrently radiate the downlink RF communications signals and absorb the uplink RF communications signals. By dynamically activating the subset of antennas in accordance to the UE locations, it is possible to optimize signal strength and channel quality for each UE in the DCS, thus making it possible to improve wireless data capacity of the DCS with negligible additional hardware cost.

One exemplary embodiment of the disclosure relates to a DCS. The DCS includes a plurality of remote units configured to communicate downlink and uplink RF communications signals with a plurality of UEs at a plurality of UE locations in the DCS. The plurality of remote units each includes a plurality of RF chains. The plurality of RF chains is configured to receive a plurality of downlink digital communications signals, respectively. The plurality of RF chains is also configured to convert the plurality of downlink digital communications signals into a plurality of downlink RF communications signals, respectively. The plurality of remote units each also includes a plurality of antennas each configured to be an active antenna or an inactive antenna. A number of the plurality of antennas is more than a number of the plurality of RF chains. The plurality of remote units each also includes an RF switch circuit configured to couple the plurality of RF chains to a subset of the plurality of antennas in accordance to the plurality of UE locations to activate the subset of the plurality of antennas to concurrently radiate the plurality of downlink RF communications signals.

An additional exemplary embodiment of the disclosure relates to a method for supporting DM-MIMO in a DCS. The method includes, in each of a plurality of remote units configured to communicate downlink and uplink RF communications signals with a plurality of UEs at a plurality of UE locations in the DCS, providing a plurality of antennas each configured to be an active antenna or an inactive antenna. The method also includes, in each of the plurality of remote units, receiving a plurality of downlink digital communications signals via a plurality of RF chains. A number of the plurality of antennas is more than a number of the plurality of RF chains. The method also includes, in each of the plurality of remote units, converting the plurality of downlink digital communications signals into a plurality of downlink RF communications signals, respectively. The method also includes, in each of the plurality of remote units, coupling the plurality of RF chains to a subset of the plurality of antennas in accordance to the plurality of UE locations in the DCS to activate the subset of the plurality of antennas to concurrently radiate the plurality of downlink RF communications signals.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 7A and 7B provide exemplary illustrations of determining a subset of active antennas in the indoor building of FIG. 5A based on the locations of the UE as determined by the process in FIG. 6;

DETAILED DESCRIPTION

Embodiments disclosed herein include supporting distributed massive multiple-input multiple-output (DM-MIMO) in a distributed communications system (DCS). The DCS includes a number of remote units each configured to communicate downlink and uplink radio frequency (RF) communications signals with a number of user equipment (UEs) at different UE locations in the DCS. Each remote unit includes a number of antennas and a number of RF chains for supporting DM-MIMO. In a non-limiting example, the number of antennas is more than the number of RF chains. As such, only a subset of the antennas may be activated at any given time. In this regard, each remote unit further includes an RF switch circuit configured to dynamically couple the RF chains to the subset of antennas in accordance to the UE locations such that the subset of antennas can be activated to concurrently radiate the downlink RF communications signals and absorb the uplink RF communications signals. By dynamically activating the subset of antennas in accordance to the UE locations, it is possible to optimize signal strength and channel quality for each UE in the DCS, thus making it possible to improve wireless data capacity of the DCS with negligible additional hardware cost.

Figure 1:
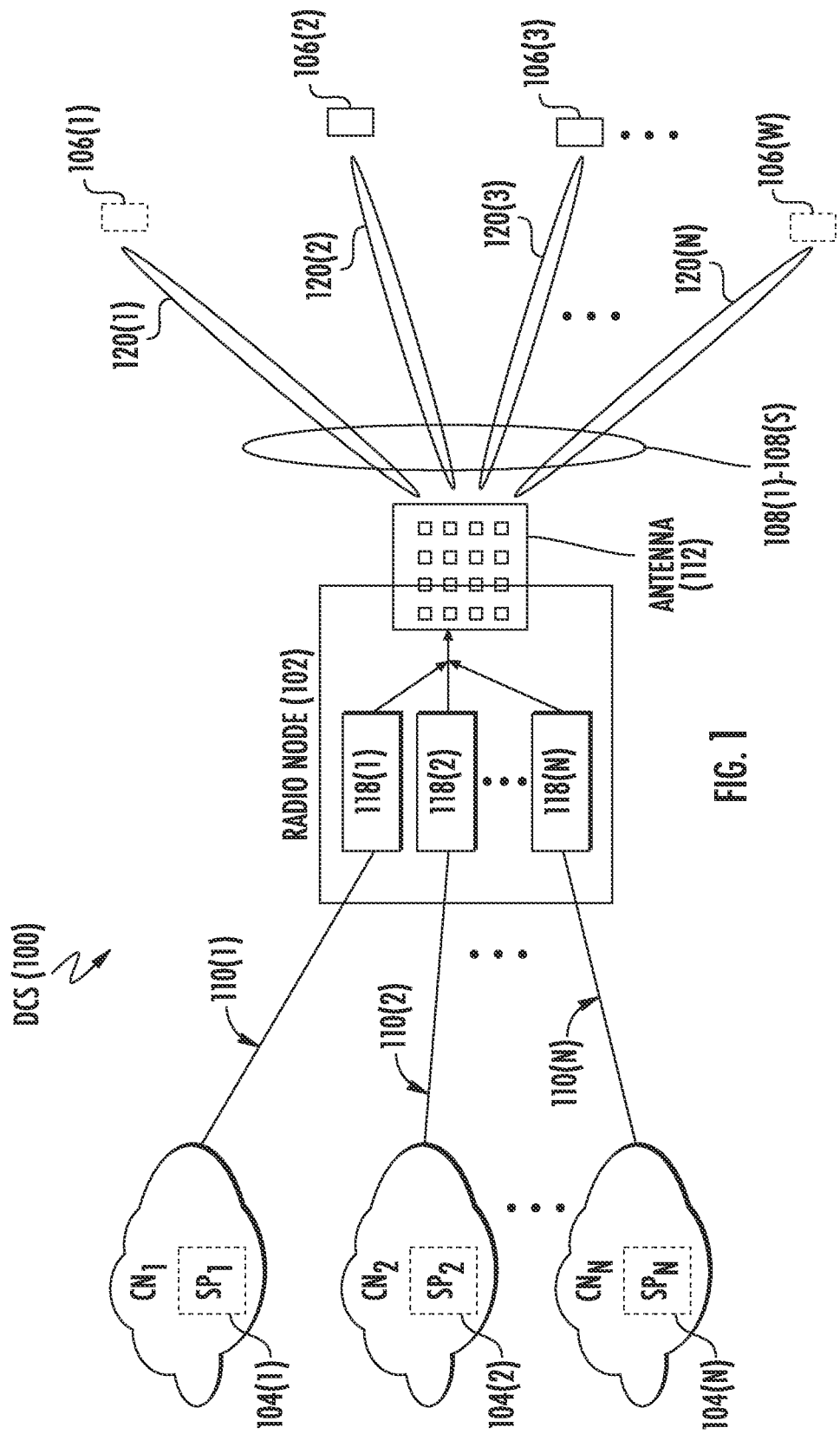
FIG. 1 is a schematic diagram of an exemplary wireless communications system (WCS), such as a distributed communications system (DCS), configured to distribute communications services to remote coverage areas.
Figure 2:
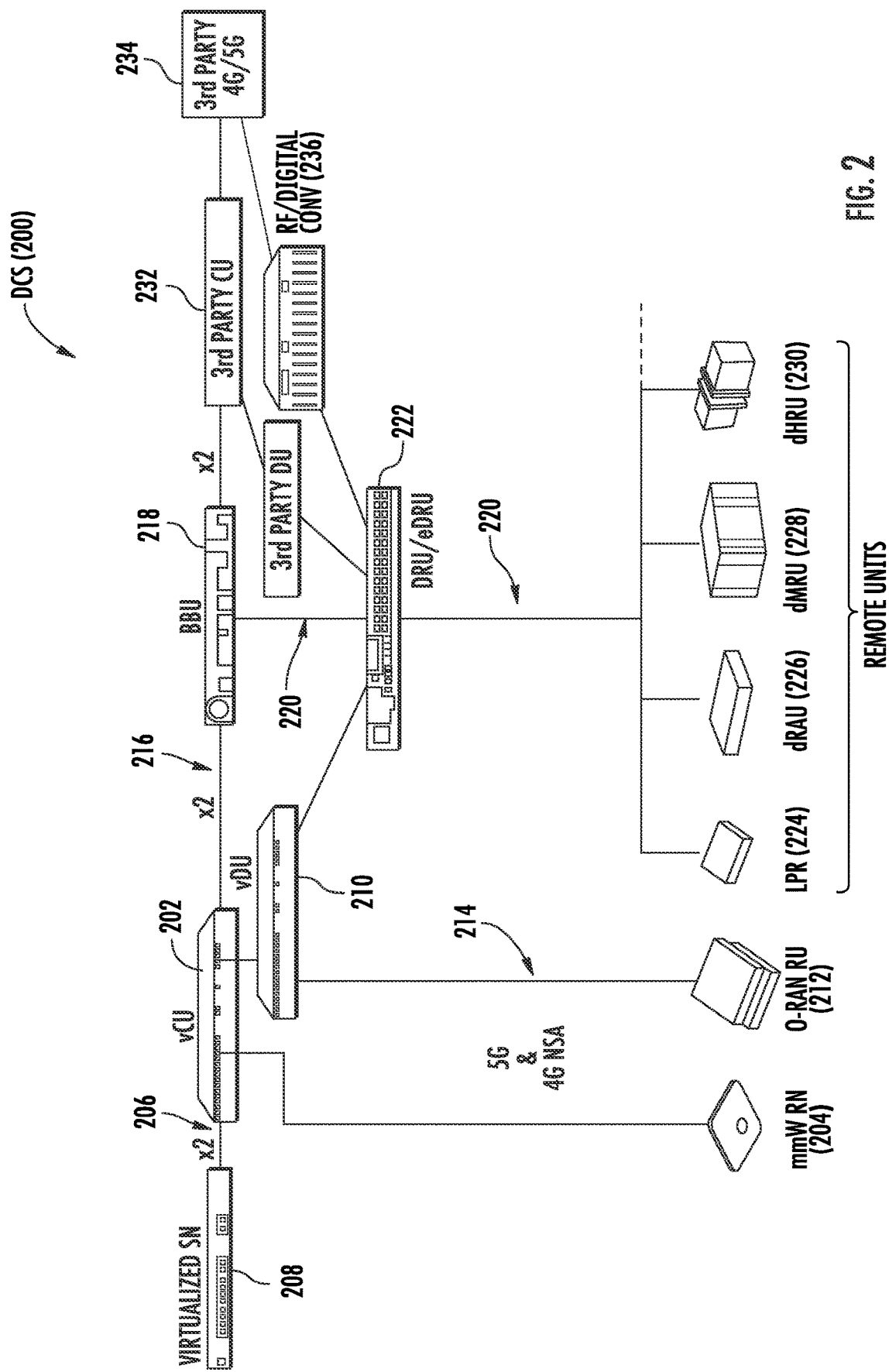
FIG. 2 is a schematic diagram of an exemplary DCS for supporting distributed massive multiple-input multiple-output (DM-MIMO) according to any of the embodiments disclosed herein.

In this regard, FIG. 2 is a schematic diagram of an exemplary DCS 200 for reducing an uplink accumulated noise floor according to any of the embodiments disclosed herein. The DCS 200 supports both legacy 4G LTE, 4G/5G non-standalone (NSA), and 5G communications systems. As shown in FIG. 2, a centralized services node 202 is provided that is configured to interface with a core network to exchange communications data and distribute the communications data as radio signals to remote units. In this example, the centralized services node 202 is configured to support distributed communications services to a millimeter wave (mmW) radio node 204. The functions of the centralized services node 202 can be virtualized through an x2 interface 206 to another services node 208. The centralized services node 202 can also include one or more internal radio nodes that are configured to be interfaced with a distribution node 210 to distribute communications signals for the radio nodes to an open random access network (O-RAN) remote unit 212 that is configured to be communicatively coupled through an O-RAN interface 214.

The centralized services node 202 can also be interfaced through an x2 interface 216 to a digital baseband unit (BBU) 218 that can provide a digital signal source to the centralized services node 202. The digital BBU 218 is configured to provide a signal source to the centralized services node 202 to provide radio source signals 220 to the O-RAN remote unit 212 as well as to a digital routing unit (DRU) 222 as part of a digital distributed antenna system (DAS). The DRU 222 is configured to split and distribute the radio source signals 220 to different types of remote units, including a lower power remote unit (LPR) 224, a radio antenna unit (dRAU) 226, a mid-power remote unit (dMRU) 228, and a high power remote unit (dHRU) 230. The digital BBU 218 is also configured to interface with a third party central unit 232 and/or an analog source 234 through an RF/digital converter 236.

As discussed in specific examples in FIG. 3 below, the LPR 224, the dRAU 226, the dMRU 228, and the dHRU 230 can each operate as a remote unit for supporting DM-MIMO according to embodiments of the present disclosure. Specifically, each of the LPR 224, the dRAU 226, the dMRU 228, and the dHRU 230 can include tens or even hundreds of antennas to concurrently radiate multiple downlink RF signals to and absorb multiple uplink RF signals from a large number of UEs in the DCS 200 using spatial multiplexing. In this regard, each of the LPR 224, the dRAU 226, the dMRU 228, and the dHRU 230 is configured to operate based on a massive multiple-input multiple-output (M-MIMO) scheme.

Figure 3:
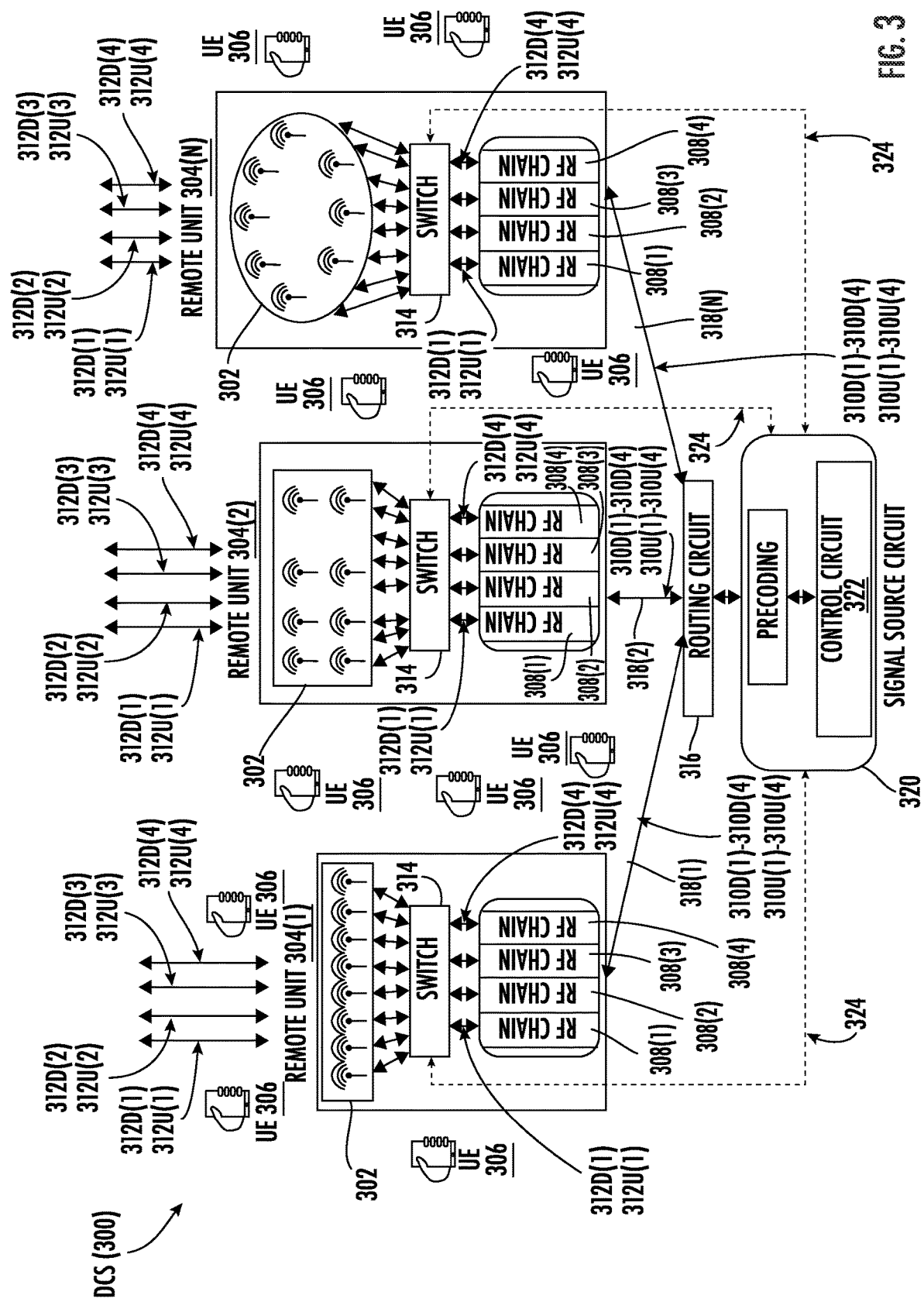
FIG. 3 is a schematic diagram of an exemplary DCS, such as the DCS of FIG. 2, configured to support DM-MIMO by dynamically activating a subset of a plurality of antennas in each of a plurality of remote units according to determined locations of a number of user equipment (UEs) in the DCS.

In addition, as shown in FIG. 3 below, each of the LPR 224, the dRAU 226, the dMRU 228, and the dHRU 230 can be configured to include multiple RF chains to process the downlink and uplink RF signals. By providing the RF chains in each of the LPR 224, the dRAU 226, the dMRU 228, and the dHRU 230 to operate in the M-MIMO scheme, the DCS 200 can be said to support DM-MIMO. As such, the DCS 200 is different from a conventional DCS that supports collocated M-MIMO (CM-MIMO), wherein the RF chains would be collocated in, for example, the digital BBU 218 or the DRU 222, as opposed to being distributed in each of the LPR 224, the dRAU 226, the dMRU 228, and the dHRU 230. Studies have shown that DM-MIMO can outperform CM-MIMO in terms of capacity and coverage in an indoor environment.

Further, as discussed in FIG. 3, the digital BBU 218 may be configured according to embodiments of the present disclosure to determine locations of the UEs in the DCS 200 and activate a subset of antennas in each of the LPR 224, the dRAU 226, the dMRU 228, and the dHRU 230 in accordance to the determined UE locations. By dynamically activating the subset of antennas based on the UE locations, it is possible to optimize signal strength and channel quality for each UE in the DCS 200, thus making it possible to improve wireless data capacity of the DCS 200 with negligible additional hardware cost. In addition, by configuring the DCS 200 to support DM-MIMO based on embodiments disclosed herein, the DCS 200 may have better energy efficiency and system performance reliability through better antenna diversity. The DCS 200 may also provide inherent system intelligence, which may be used to monitor and determine the UE locations, without significantly increasing computational complexity.

FIG. 3 is a schematic diagram of an exemplary DCS 300, such as the DCS 200 of FIG. 2, configured to support DM-MIMO by dynamically activating a subset of a plurality of antennas 302 in each of a plurality of remote units 304(1)-304(N) according to a number of UE locations associated with a number of UEs 306 in the DCS 300. In a non-limiting example, each of the remote units 304(1)-304(N) can be configured to function as any one of the LPR 224, the dRAU 226, the dMRU 228, and the dHRU 230 in the DCS 200.

Although each of the remote units 304(1)-304(N) is shown to include a specific number (e.g., 8) of the antennas 302, it should be appreciated that each remote unit 304(1)-304(N) can be configured to include more or less than the antennas 302 illustrated herein. Understandably, each of the antennas 302 can be configured to be an active antenna (a.k.a. activated) when excited by an RF signal or be an inactive antenna (a.k.a. deactivated) when not excited by the RF signal. Notably, each of the remote units 304(1)-304(N) can be configured to include an identical or different number of the antennas 302.

The remote units 304(1)-304(N) can be configured to support DM-MIMO based on embodiments disclosed herein independent of how the antennas 302 are provided in each of the remote units 304(1)-304(N). For example, the antennas 302 in the remote unit 304(1) are provided according to a linear arrangement with uniform separation distances, the antennas 302 in the remote unit 304(2) are provided according to a matrix arrangement with non-uniform separation distances, and the antennas 302 in the remote unit 304(N) are provided according to a circular arrangement.

To support DM-MIMO, each of the remote units 304(1)-304(N) is configured to include a plurality of RF chains 308(1)-308(4). Notably, the RF chains 308(1)-308(4) in each of the remote units 304(1)-304(N) are merely non-limiting examples for the convenience of illustration. It should be appreciated that each of the remote units 304(1)-304(N) can include more or less than the RF chains 308(1)-308(4). The RF chains 308(1)-308(4) in each of the remote units 304(1)-304(N) are configured to receive a plurality of downlink digital communications signals 310D(1)-310D(4) and converts the downlink digital communications signals 310D(1)-310D(4) into a plurality of downlink RF communications signals 312D(1)-312D(4), respectively. The RF chains 308(1)-308(4) in each of the remote units 304(1)-304(N) are also configured to receive a plurality of uplink RF communications signals 312U(1)-312U(4) and converts the uplink RF communications signals 312U(1)-312U(4) into a plurality of uplink digital communications signals 310U(1)-310U(4), respectively. In a non-limiting example, each of the downlink RF communications signals 312D(1)-312D(4) and each of the uplink RF communications signals 312U(1)-312U(4) are different from one another.

Each of the remote units 304(1)-304(N) includes more of the antennas 302 than the RF chains 308(1)-308(4). In a non-limiting example, as shown in FIG. 3, each of the remote units 304(1)-304(N) includes 8 antennas 302 versus 4 RF chains 308(1)-308(4). Notably, by employing more antennas 302 than the RF chains 308(1)-308(4) in each of the remote units 304(1)-304(N), it is possible to radiate the downlink RF communications signals 312D(1)-312D(4) and absorb the uplink RF communications signals 312U(1)-312U(4) via a dynamically selected subset of the antennas 312. As a result, each of the remote units 304(1)-304(N) is able to dynamically steer the antennas 312 to track movement of the UEs 306, thus helping to provide robust connection and improve data throughput for each of the UEs 306.

Given that there are more antennas 302 than the RF chains 308(1)-308(4) in each of the remote units 304(1)-304(N), each of the remote units 304(1)-304(N) further includes an RF switch circuit 314 (denoted as "switch"). The RF switch circuit 314, which can include any type and number of switches, is provided between the antennas 302 and the RF chains 308(1)-308(4) in each of the remote units 304(1)-304(N). The RF switch circuit 314 can be configured to dynamically couple the RF chains 308(1)-308(4) to a subset of the antennas 302 in accordance to the determined UE locations of the UEs 306 to activate the subset of the antennas 302 to concurrently radiate the downlink RF communications signals 312D(1)-312D(4) and to concurrently absorb the uplink RF communications signals 312U(1)-312U(4).

Figure 4:
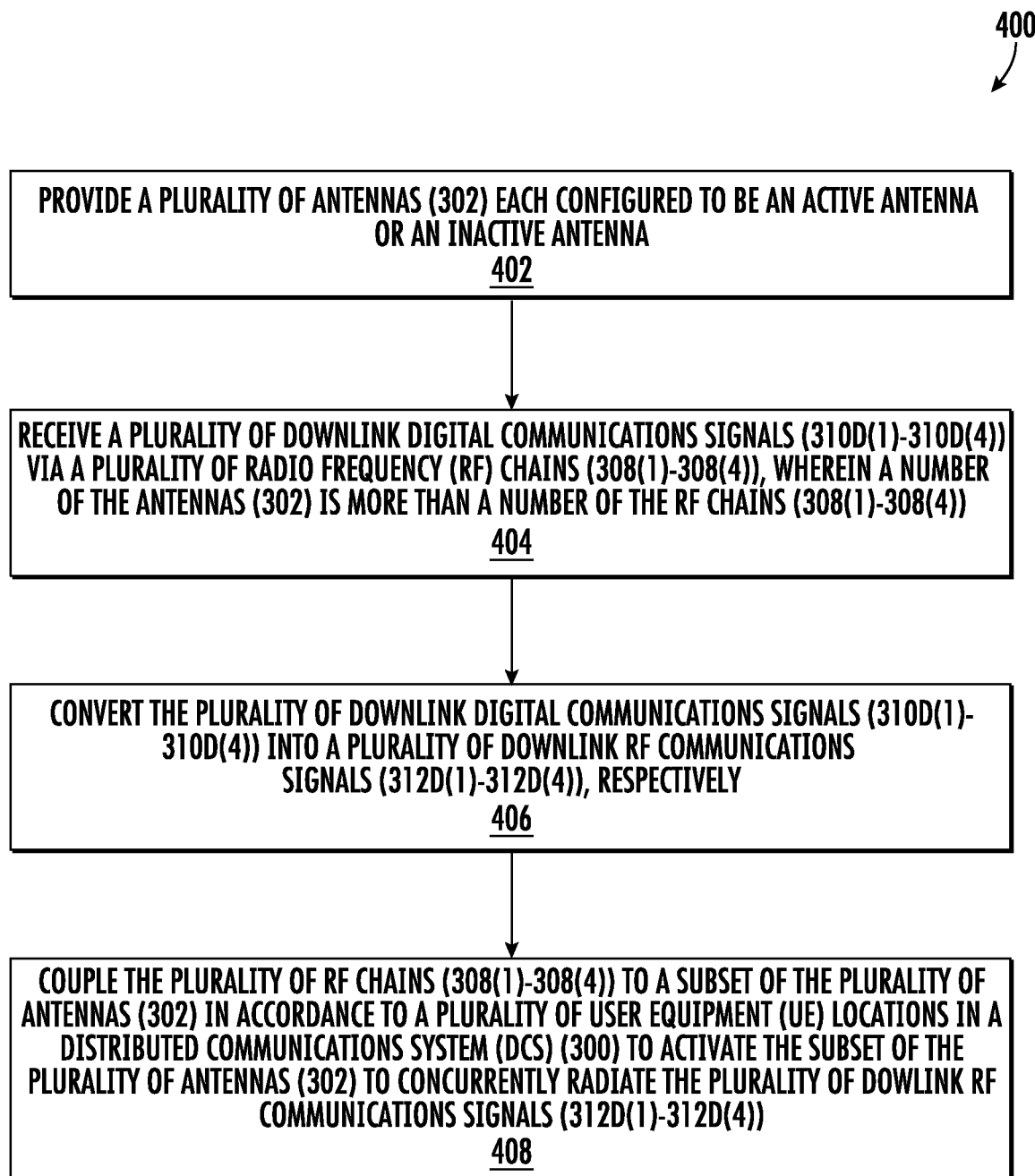
FIG. 4 is a flowchart of an exemplary process for supporting DM-MIMO in the DCS of FIG. 3.

Each of the remote units 304(1)-304(N) can be configured to support DM-MIMO based on a process. In this regard, FIG. 4 is a flowchart of an exemplary process 400 for supporting DM-MIMO in the DCS 300 of FIG. 3.

Each of the remote units 304(1)-304(N) is provided with the antennas 302 each configured to be an active antenna or an inactive antenna (block 402). Each of the remote units 304(1)-304(N) is configured to receive the downlink digital communications signals 310D(1)-310D(4) via the RF chains 308(1)-308(4) (block 404). Notably, the number of the antennas 302 is more than the number of the RF chains 308(1)-308(4) in each of the remote units 304(1)-304(N). Each of the remote units 304(1)-304(N) is configured to convert the downlink digital communications signals 310D(1)-310D(4) into the downlink RF communications signals 312D(1)-312D(4), respectively (block 406). In each of the remote units 304(1)-304(N), the RF switch circuit 314 in each of the remote units 304(1)-304(N) is configured to couple the RF chains 308(1)-308(4) to a subset of the antennas 302 in accordance to the UE locations in the DCS 300 to activate the subset of the antennas 302 to concurrently radiate the downlink RF communications signals 312D(1)-312D(4) (block 408).

With reference back to FIG. 3, the DCS 300 also includes a routing circuit 316, which can be functionally equivalent to the DRU 222 in FIG. 2. The routing circuit 316 is coupled to the remote units 304(1)-304(N) via a plurality of fronthaul links 318(1)-318(N), which can be optical fiber-based fronthaul links, as an example. The routing circuit 316 is configured to provide the downlink digital communications signals 310D(1)-310D(4) to each of the remote units 304(1)-304(N) via a respective one of the fronthaul links 318(1)-318(N). The routing circuit 316 is also configured to receive the uplink digital communications signals 310U(1)-310U(4) from each of the remote units 304(1)-304(N) via the respective one of the fronthaul links 318(1)-318(N).

The DCS 300 further includes a signal source circuit 320, which can be identical to the digital BBU 218 in FIG. 2, as an example. In a non-limiting example, the signal source circuit 320 is coupled to the routing circuit 316 via common public radio interface (CPRI). The signal source circuit 320 includes a control circuit 322, which can be a field-programmable gate array (FPGA), as an example. As discussed in detail below, the control circuit 322 is configured to determine the UE locations for the UEs 306 in the DCS 300. The control circuit 322 is also configured to the subset of the antennas 302 to be activated in each of the remote units 304(1)-304(N) based on the determined UE locations. Accordingly, the control circuit 322 controls the RF switch circuit 314 in each of the remote units 304(1)-304(N) to couple the RF chains 308(1)-308(4) to the determined subset of the antennas 302 to activate the subset of the antennas 302. In a non-limiting example, the control circuit 322 can control each of the remote units 304(1)-304(N) based on a dedicated control signal 324.

Figures 5A, 5B:
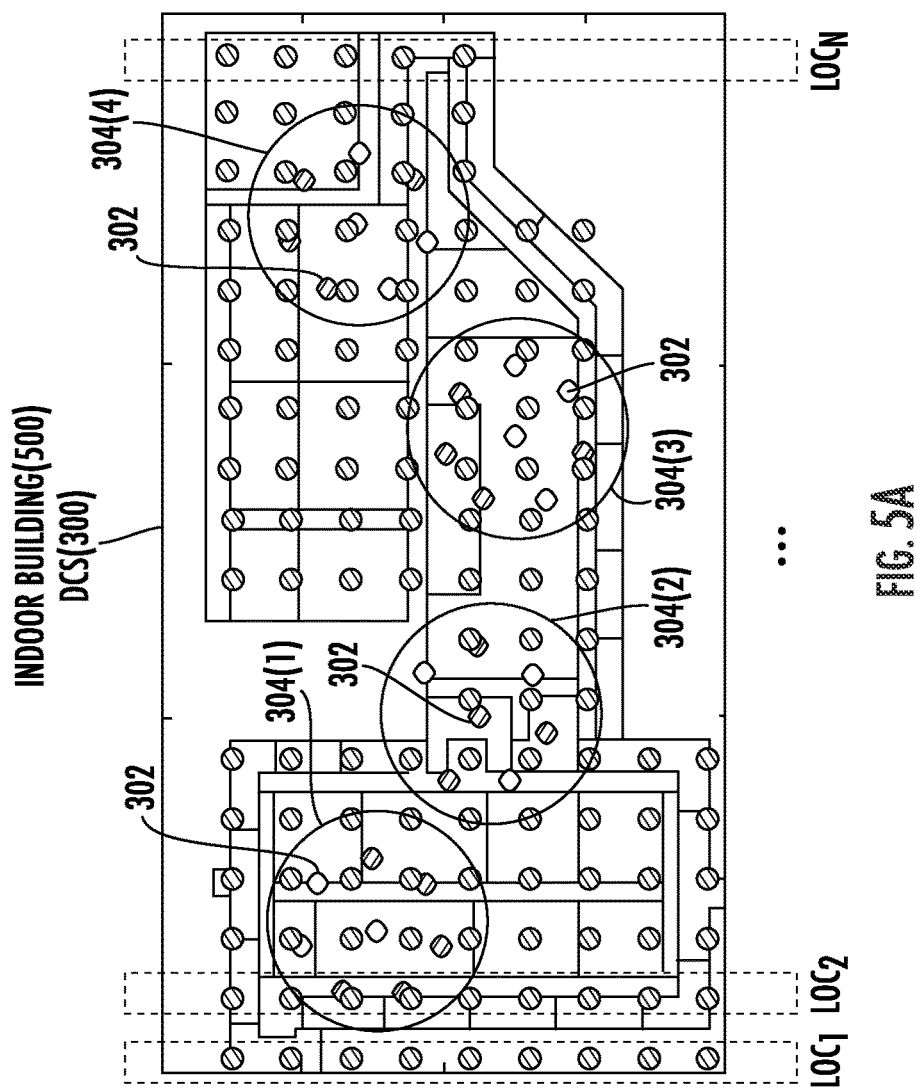
FIG. 5A is a schematic diagram of an exemplary indoor building in which the DCS of FIG. 3 is deployed.
FIG. 5B is an exemplary reference database that correlates the antennas in all of the remote units in the DCS of FIG. 3 with predetermined locations in the indoor building of FIG. 5A.

In a non-limiting example, the control circuit 322 is configured to determine the UE locations for the UEs 306 in the DCS 300 based on a reference database, which is a mesh grid representing an indoor environment of the DCS 300 in conjunction with the antennas 302 in all of the remote units 304(1)-304(N). In this regard, FIG. 5A is a schematic diagram of an exemplary indoor building 500 in which the DCS 300 of FIG. 3 is deployed.

For the convenience of illustration and reference, only four (4) remote units 304(1)-304(4) among the remote units 304(1)-304(N) are shown herein. In a non-limiting example, each of the remote units 304(1)-304(4) includes eight (8) antennas 302. Accordingly, a total of thirty-two (32) antennas 302 are deployed in the indoor building 500. In a non-limiting example, the 32 antennas 302 can be uniquely identified by an arbitrarily assigned integer number between 1 and 32. For example, the antennas 302 in the remote unit 304(1) can be identified by integer numbers 1 to 8, the antennas 302 in the remote unit 304(2) can be identified by integer numbers 9 to 16, the antennas 302 in the remote unit 304(3) can be identified by integer numbers 17 to 24, and the antennas 302 in the remote unit 304(4) can be identified by integer numbers 25 to 32.

According to previous discussions in FIG. 3, each of the remote units 304(1)-304(4) includes the RF chains 308(1)-308(4). As such, only four (4) of the 8 antennas 302 can be activated in each of the remote units 304(1)-304(4) at any given time. Accordingly, there can only be a total of sixteen (16) active antennas 302 among all of the remote units 304(1)-304(4) at any given time. Therefore, in this example, the DCS 300 in the indoor building 500 can have a maximum of 16 active antennas 302 at any given time.

The indoor building 500 may be mapped by a plurality of predefined locations $LOC_1$-$LOC_N$. Each of the predefined locations $LOC_1$-$LOC_N$ may be uniquely identified by an arbitrarily assigned integer number between 1 and N.

FIG. 5B is an exemplary reference database 502 that correlates the antennas 302 in all of the remote units 304(1)-304(4) in the DCS 300 of FIG. 3 with the predefined locations $LOC_1$-$LOC_N$ in the indoor building 500 of FIG. 5A. In a non-limiting example, the reference database 502 includes a plurality of rows $R_1$-$R_{32}$ and a plurality of columns $C_1$-$C_N$. Each of the rows $R_1$-$R_{32}$ represents a respective one of the 32 antennas 302 deployed in the indoor building 500. Each of the columns $C_1$-$C_N$ represents a respective one of the predefined locations $LOC_1$-$LOC_N$ in the indoor building 500. Cross points h11-h32N each contains a channel amplitude response that is expected from a respective antenna in a respective one of the rows $R_1$-$R_{32}$ at a respective location in a respective one of the columns $C_1$-$C_N$. For example, h11 represents the channel amplitude response that is expected from the antenna 302 in the remote unit 304(1) that is identified by the integer number 1 at the predefined location $LOC_1$.

The reference database 502 may be predetermined using a selected channel model based on a layout (e.g., the indoor building 500) of the DCS 300. Alternatively, it is also possible to predetermine the reference database 502 through experiments. For example, it is possible to predetermine the reference database 502 by measuring an RF power radiated from the antennas 302 in each of the remote units 304(1)-304(4) at each of the predefined locations $LOC_1$-$LOC_N$ in the DCS 300.

Figure 6:
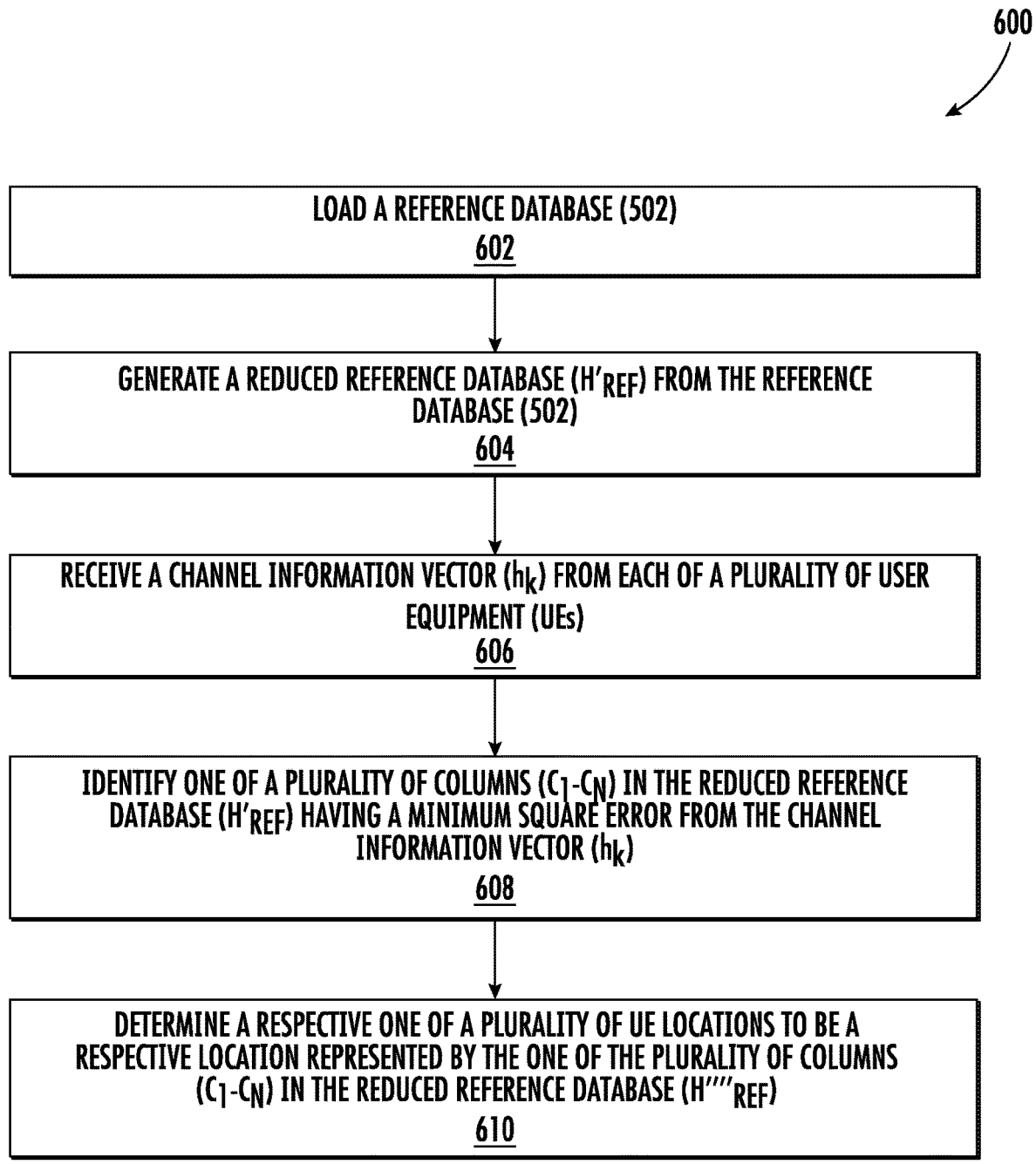
FIG. 6 is a flowchart of an exemplary process that can be employed by the DCS of FIG. 3 to determine the locations of the UEs in the indoor building of FIG. 5A based on the reference database of FIG. 5B.

With reference back to FIG. 2, the control circuit 322 can be configured to determine the UE locations of the UEs 306 in the indoor building 500 of FIG. 5A based on a process. In this regard, FIG. 6 is a flowchart of an exemplary process 600 that can be employed by the control circuit 322 in the DCS 300 of FIG. 3 to determine the UE locations of the UEs 306 in the indoor building 500 of FIG. 5A based on the reference database 502 of FIG. 5B.

The control circuit 322 is configured to first load the reference database 502 (also referred to as "reference database $H_{REF}$" hereinafter) (block 602). The reference database $H_{REF}$ may be expressed as $H_{REF} \in C^{Nt*Nxy}$, wherein $N_t$ is the total number of antennas 302 (active and inactive), which is 32 in the indoor building 500 of FIG. 5A, $N_{xy}$ is the total number predefined locations $LOC_1$-$LOC_N$ in the indoor building 500. In this regard, $N_t$ equals the number of rows $R_1$-$R_{32}$ in the reference database 502 and $N_{xy}$ equals the number of columns $C_1$-$C_N$ in the reference database 502.

The control circuit 322 is configured to generate a reduced reference database H'REF from the reference database $H_{REF}$ (block 604). The reduced reference database H'REF includes a subset of the rows $R_1$-$R_{32}$ in the reference database $H_{REF}$ and all of the columns $C_1$-$C_N$ in the reference database $H_{REF}$. More specifically, the subset of the rows $R_1$-$R_{32}$ included in the reduced reference database H'$_{REF}$ correspond to a subset of active antennas among the antennas 302 in each of the remote units 304(1)-304(4). In this regard, in the example of FIG. 5A, the reduced reference database H'$_{REF}$ includes 16 rows corresponding to 16 active antennas in the indoor building 500. The reduced reference database H'$_{REF}$ may be expressed as H'$_{REF} \in C^{Na*Nxy}$, wherein $N_a$ is the total number of active antennas among the antennas 302, which is 16 in the indoor building 500 of FIG. 5A, $N_{xy}$ is the total number predefined locations $LOC_1$-$LOC_N$ in the indoor building 500.

The control circuit 322 receives a channel information vector $h_k$ from each of the UEs 306 in the DCS 300 of FIG. 3 (block 606). In a non-limiting example, the channel information vector $h_k$ includes a plurality of power measurements corresponding to the subset of the antennas 302 activated in each of the remote units 304(1)-304(4). In other words, the channel information vector $h_k$ includes the power measurements corresponding to the subset of the rows $R_1$-$R_{32}$ in the reduced reference database H'$_{REF}$. In a non-limiting example, the signal source circuit 320 can provide one or more pilot signals, such as channel state information (CSI) reference signal (RS) (CSI-RS) and demodulation reference signal (DM-RS), to each of the remote units 304(1)-304(4) in the DCS 300. Each of the remote units 304(1)-304(4) radiates the pilot signals via the subset of active antennas, which are represented by the subset of the rows $R_1$-$R_{32}$ in the reduced reference database H'$_{REF}$, in the indoor building 500. Accordingly, each of the UEs 306 can measure the power in the pilot signals received from the subset of active antennas in each of the remote units 304(1)-304(4) to generate the channel information vector $h_k$. The channel information vector $h_k$ may be expressed as $h_k \in C^{1*Na}$, wherein $N_a$ is the total number of active antennas among the antennas 302, which is 16 in the indoor building 500 of FIG. 5A.

The control circuit 322 is configured to convert the channel amplitude response in each of the subset of the rows $R_1$-$R_{32}$ and each of the columns $C_1$-$C_N$ in the reduced reference database H'$_{REF}$ into respective decibel (dB) terms. As a result, the reduced reference database H'$_{REF}$ may be further expressed as H''$_{REF}$=20 $\log_{10}$(|H'$_{REF}$|). The control circuit 322 is also configured to convert the power measurements in the channel information vector $h_k$ into respective dB terms. As a result, the channel information vector $h_k$ may be further expressed as h'$_k$=20 $\log_{10}$(|$h_k$|).

The control circuit 322 is configured to identify one of the columns $C_1$-$C_N$ in the reduced reference database H''$_{REF}$ having a minimum square error e from the channel information vector h'$_k$ (block 608). In a non-limiting example, the control circuit 322 adjusts offset in the reduced reference database H''$_{REF}$ based on the channel information vector h'$_k$. Accordingly, the reduced reference database H'''$_{REF}$ may be expressed as H'''$_{REF}$=H''$_{REF}$+mean (h'$_k$)−mean (H''$_{REF}$). Next, the control circuit 322 adjusts magnitude r between the reduced reference database H'''$_{REF}$ and the channel reference vector h'$_k$, as shown in equation (Eq. 1) below.

$$r = \sqrt{\frac{\text{mean}\{|h'_k - \text{mean}(h'k)|^2\}}{\text{mean}\{|H'''_{REF} - \text{mean}(H'''_{REF})|^2\}}} \quad \text{(Eq. 1)}$$

As a result, the reduced reference database H''''$_{REF}$ may be further expressed as H''''$_{REF}$=r*(H'''$_{REF}$−mean(H'''$_{REF}$))+mean(h'$_k$). The control circuit 322 can then calculate the minimum square error e as being equal to sum(|H''''$_{REF}$−h'$_k$|$^2$).

Subsequently, the control circuit 322 may determine a respective one of the UE locations to be the respective location represented by the one of the columns $C_1$-$C_N$ in the reduced reference database H''''$_{REF}$ (block 610). In a non-limiting example, the respective one of the UE locations can be expressed as arg{min(e)}.

The control circuit 322 may repeat the process 600 to determine the respective UE location for each of the UEs 306 in the DCS 300. The control circuit 322 may be further configured to perform the process 600 for each of the UEs 306 in multiple iterations to help improve accuracy of the UE locations determined therein.

After determining the UE locations for the UEs 306 in the DCS 300 in the indoor building 500, the control circuit 322 is further configured to determine the subset of antennas among the antennas 302 to be activated in each of the remote units 304(1)-304(4) based on the determined UE locations. In this regard, FIGS. 7A and 7B are examples of a process for determining the subset of antennas among the antennas 302 to be activated in each of the remote units 304(1)-304(4) in FIG. 5A based on the determined UE locations.

Based on number of RF chains 308(1)-308(4) included in the remote units 304(1)-304(4) in the indoor building 500, the control circuit 322 can determine a total number of active antennas in the DCS 300 in the indoor building 500 to be equal to a sum of the RF chains 308(1)-308(4) included in all of the remote units 304(1)-304(4). According to the example shown in FIG. 5A, the total number of active antennas in the DCS 300 in the indoor building 500 equals 16.

The control circuit 322 may determine the total number of active antennas in the DCS 300 in the indoor building 500 based on a two-step process. The control circuit 322 may predetermine a threshold value $TH_{PROC}$ to be less than the total number of active antennas in the DCS 300 in the indoor building 500. In a non-limiting example, the threshold value $TH_{PROC}$ can equal to one-half (½) of the total number of active antennas.

As illustrate in FIGS. 7A and 7B, the control circuit 322 may perform the two-step process based on the threshold value $TH_{PROC}$. The control circuit 322 may determine a first subset of the total number of active antennas in a first of the two-step process and a second subset of the total number of active antennas in a second of the two-step process. In the first of the two-step process, the control circuit 322 first determines the first subset of the total number of active antennas to include a number of antennas that is up to the threshold value $TH_{PROC}$. In the second of the two-step process, the control circuit 322 determines a second subset of the total number of active antennas to include another number of active antennas that equals a difference between the total number of active antennas and the threshold value $TH_{PROC}$. For example, if the total number of active antennas equals 16 and the threshold value $TH_{PROC}$ equals 8, the control circuit 322 will determine the first subset of 8 active antennas in the first of the two-step process and the second subset of another 8 active antennas in the second of the two-step process.

With reference to FIG. 7A, in the first of the two-step process, the control circuit 322 determines the first subset of the total number of active antennas by selecting one or more antennas among the antennas 302 in each of the remote units 304(1)-304(4) that provide a highest power to one or more of the UEs 306 at one or more of the UE locations determined in the process 600 of FIG. 6. For example, based on the process 600, the control circuit 322 determines that UE1 and UE2 among the UEs 306 are located at $LOC_2$ and $LOC_9$ among the predefined locations $LOC_1$-$LOC_N$ in the indoor building 500. According to the reference database $H_{REF}$, the antenna represented by row $R_3$ provides the highest power to UE1 located at the predefined location $LOC_2$ represented by column $C_2$. Accordingly, the control circuit 322 includes the antenna represented by row $R_3$ in the first subset of the total number of active antennas. Similarly, according to the reference database $H_{REF}$, the antenna represented by row $R_5$ provides the highest power to UE2 located at the predefined location $LOC_9$ represented by column $C_9$. Accordingly, the control circuit 322 includes the antenna represented by row $R_5$ in the first subset of the total number of active antennas. The control circuit 322 may repeat the first of the two-step process until the first subset of the total number of active antennas includes the number of active antennas that equals to the threshold value $TH_{PROC}$.

With reference to FIG. 7B, in the second of the two-step process, the control circuit 322 determines the second subset of the total number of active antennas by selecting another one or more antennas among the antennas 302 in each of the remote units 304(1)-304(4) that are: 1) not selected for the first subset of the total number of active antennas; and 2) provide a highest power to the one or more of the UEs 306 at the one or more of the UE locations.

Continuing with the non-limiting example in FIG. 7A, the control circuit 322 determines a total power received from one or more of the antennas 302 that are not among the first subset of the total number of active antennas at each of the UE locations. For example, given that the antennas represented by rows $R_3$ and $R_5$ are already selected in the first of the two-step process to be among the first subset of the total number of active antennas, the total power received by UE1 and UE2 at locations $LOC_2$ and $LOC_9$ would equal to the total power received from antennas represented by rows $R_1$, $R_2$, $R_4$, and $R_6$-$R_{32}$. The control circuit 322 may order the UE locations $LOC_2$ and $LOC_9$ in an ascending order based on the total power received at the UE locations $LOC_2$ and $LOC_9$. For example, if the total power received at the UE location $LOC_2$ is lower than that the total power received at the UE location $LOC_9$, the UE location $LOC_2$ would be ordered in front of the UE location $LOC_9$. Accordingly, the control circuit 322 can determine the other antennas in the second subset of the total number of active antennas that provide the highest power at the UE locations (e.g., $LOC_2$ and $LOC_9$) in accordance to the ascending order. For example, the control circuit 322 may determine that the antenna represented by row $R_7$ provides the highest total power at UE location $LOC_2$ and therefore adds the antenna represented by row $R_7$ to the second subset of the total number of active antennas. The control circuit 322 may repeat the second step of the two-step process until the total number of active antennas are determined.

Figure 8A:
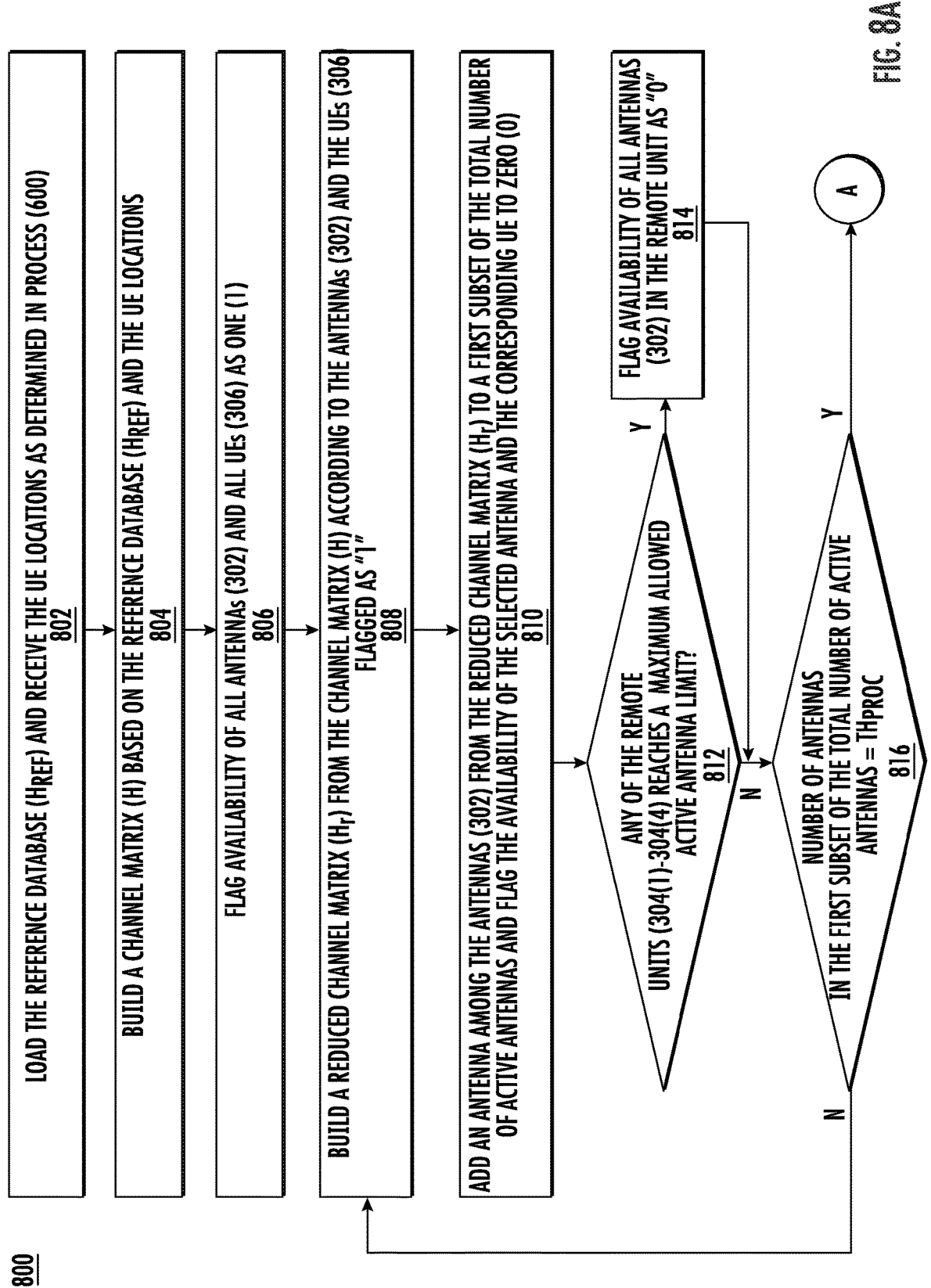
FIGS. 8A and 8B are flowcharts of an exemplary two-step process that can be employed by the DCSs of FIGS. 3 and 5A to determine a subset of active antennas in the indoor building based on the locations of the UEs determined in the process of FIG. 6.
Figure 8B:
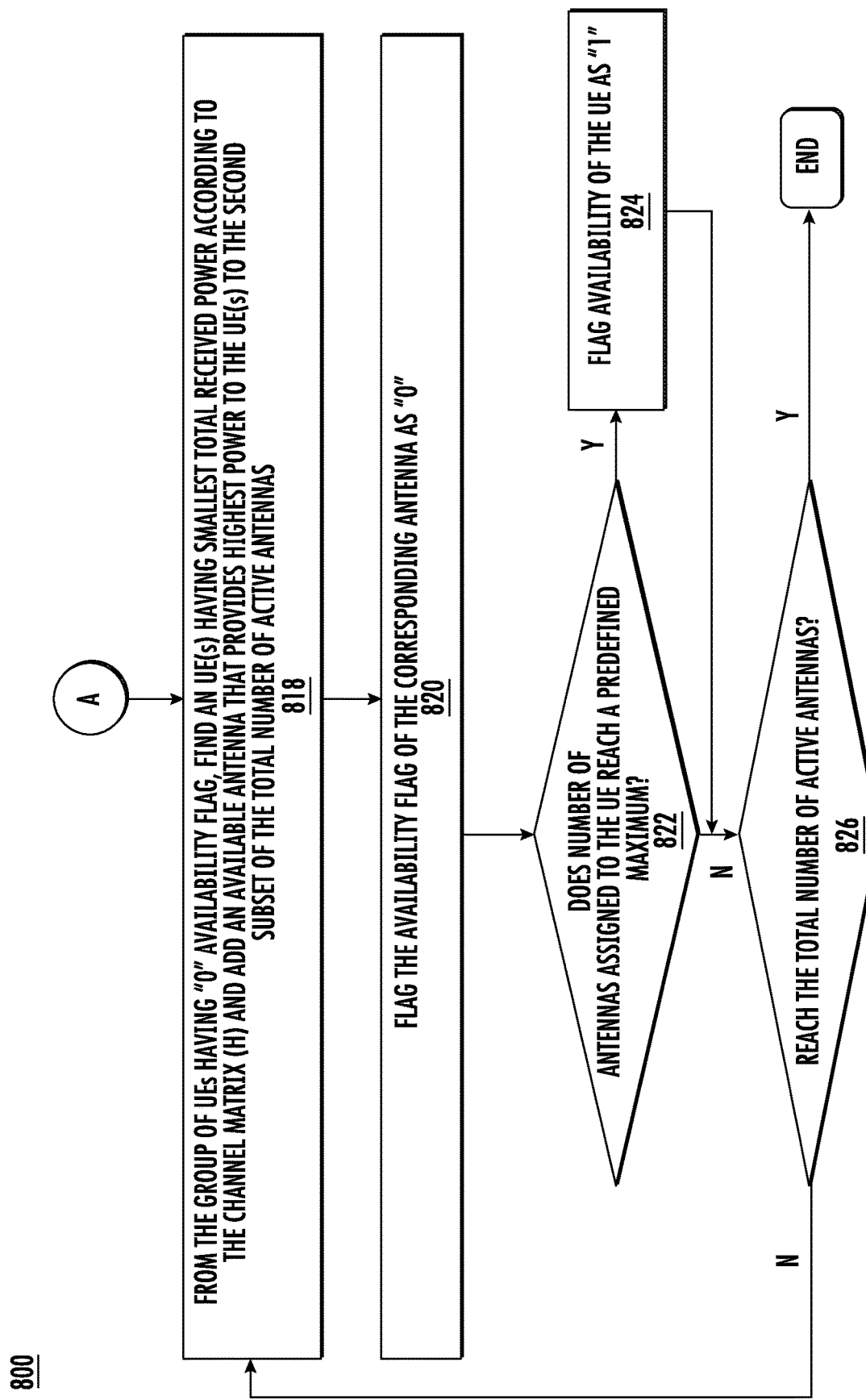

FIGS. 8A and 8B are flowcharts of an exemplary two-step process 800 that can be employed by the control circuit 322 in the DCS 300 of FIGS. 3 and 5A to the total number of active antennas in the DCS 300 in the indoor building 500 based on the UE locations determined by the process 600 of FIG. 6.

FIG. 8A is a flowchart illustrating a first of the two-step process 800. In the first of the two-step process 800, each of the UEs 306 is assigned an antenna among the antennas 302 that provides a highest signal strength according to the reference database $H_{REF}$ starting with the UE with the maximum received signal strength. During each antenna assignment, antenna availability (not yet assigned) is checked. If an antenna is assigned, the antenna will be marked unavailable. If the number of active antennas in any of the remote units 304(1)-304(4) reaches its maximum, which is determined by number of the RF chains 308(1)-308(4) in the remote unit, all of the antennas 302 in the remote unit will be marked as unavailable.

In this regard, the control circuit 322 loads the reference database $H_{REF}$ and receives the UE locations as determined in the process 600 of FIG. 6 (block 802). The control circuit 322 then builds a channel matrix H based on the reference database $H_{REF}$ and the UE locations (block 804). The channel matrix H may be expressed as $H \in C^{Nt*Nue}$, wherein $N_t$ is the total number of antennas 302 (active and inactive) and $N_{ue}$ is the number of UE antennas. The control circuit 322 flags availability of all of the antennas 302 and all of the UEs 306 as one (1) (block 806). The control circuit 322 builds a reduced channel matrix $H_r$ from the channel matrix H according to the antennas 302 and the UEs 306 that are flagged as "1" (block 808). The control circuit 322 then adds an antenna among the antennas 302 from the reduced channel matrix $H_r$ to the first subset of the total number of active antennas and subsequently flags the availability of the selected antenna and corresponding UE to zero (0) (block 810). In a non-limiting example, the control circuit 322 selects the antenna to be added to the first subset of the total number of active antennas according to $max(|H_r|)$. The control circuit 322 then checks whether any of the remote units 304(1)-304(4) has reached a maximum allowed active antenna limit, which is dependent on a number of the RF chains 308(1)-308(4) in the remote unit (block 812). The control circuit 322 flags the availability of all the antennas 302 in the remote unit as "0" if the maximum allowed active antenna limit has been reached (block 814). Otherwise, the control circuit 322 checks whether the number of antennas in the first subset of the total number of active antennas has reached the threshold value $TH_{PROC}$ (block 816). The control circuit 322 returns to block 808 if the number of antennas in the first subset of the total number of active antennas has not reached the threshold value $TH_{PROC}$, otherwise the control circuit 322 proceeds to the second of the two-step process 800 (denoted as "A").

FIG. 8B is a flowchart illustrating a second of the two-step process 800. In the second of the two-step process 800, the UE with the smallest total received signal strength from the already assigned antennas is chosen and then a next available antenna is assigned to this UE based on the signal power information in the reference database $H_{REF}$. The second of the two-step process 800 prioritizes the UE each time with the weakest signal until a pre-defined maximum number (e.g., 3) of antenna allocations to any single UE is reached. The value of the pre-defined maximum number may depend on configuration of the DCS 300. During the second of the two-step process 800, every selected antenna has a targeting UE. For each UE, the control circuit 322 records the number (X) of antennas that are selected targeting the same UE. Accordingly, the control circuit 322 sets a constraint that for each UE such that the number X does not exceed the pre-defined maximum number. This limit is incorporated to prevent the allocation of too many antennas to UEs that are hardest to reach (e.g., with weakest signals), which would unfairly deprive the other UEs of good signals and negatively impact the overall capacity gain in the DCS 300.

In this regard, the control circuit 322 finds a UE(s) from the group of UEs having the "0" availability flag that have a smallest total received power according to the channel matrix H. The control circuit 322 then adds an available antenna that provides a highest power to the UE(s) to the second subset of the total number of active antennas (block 818). The control circuit 322 flags the availability flag of the corresponding antenna as "0" (block 820). The control circuit 322 then checks whether the number of antennas assigned to the UE has reached the predefined maximum number (block 822). If the number of antennas assigned to the UE has reached the predefined maximum number, the control circuit 322 flags availability of the UE as "1" (block 824). The control circuit 322 further changes whether the total number of active antennas has been reached (block 826). The control circuit 322 returns to block 818 if the total number of active antennas has not been reached. Otherwise, the control circuit 322 ends the two-step process 800.

The DCS 300 of FIG. 3, which is configured to dynamically activate the subset of antennas in accordance to the UE locations, can optimize signal strength and channel quality for each UE in the DCS 300, thus making it possible to improve wireless data capacity of the DCS 300. In this regard, FIGS. 9A and 9B are graphic diagrams providing exemplary illustrations of capacity improvement that can be achieved by the DCS 300 of FIG. 3.

Figure 9B:
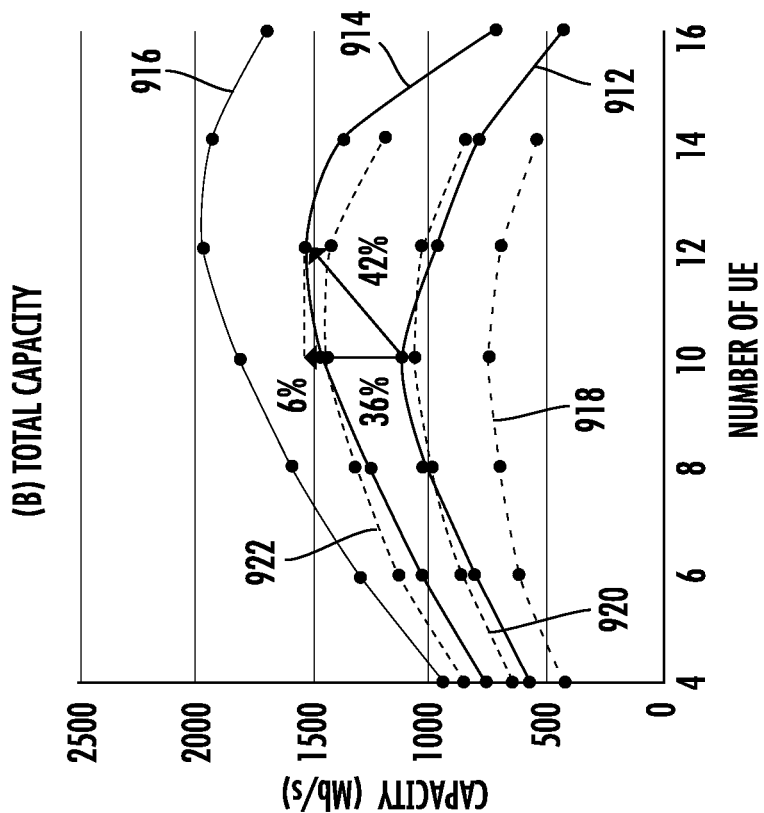
FIGS. 9A and 9B are graphic diagrams providing exemplary illustrations of capacity improvement that can be achieved by the DCS of FIG. 3.
Figure 9A:
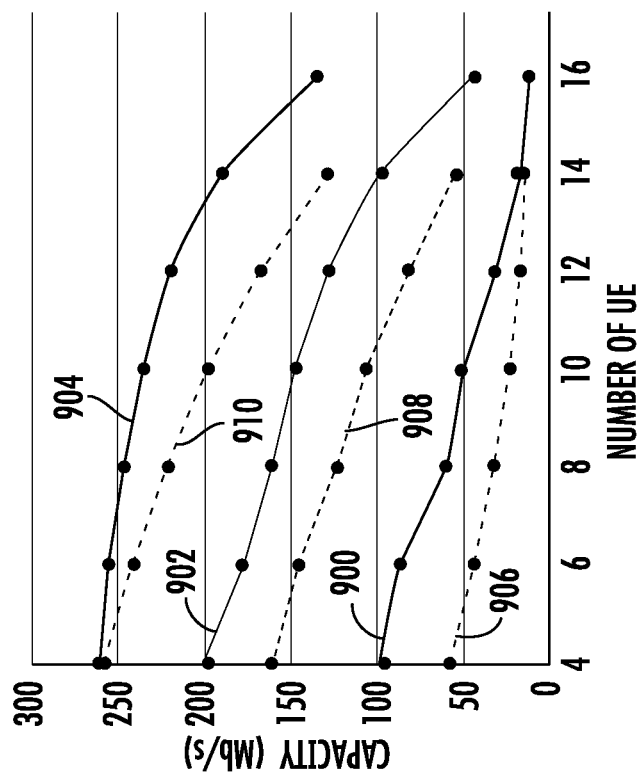

FIG. 9A illustrates per-UE capacity improvements of the DCS 300. In FIG. 9A, solid curves 900, 902, and 904 represent per-UE capacity achieved in the DCS 300 in the indoor building 500 of FIG. 5A with respect to 95%, 50%, and 5% cumulative distribution function (CDF), respectively. Herein, 95%, 50%, and 5% CDF represent different distances to a cell center, with 95% CDF being the closest (e.g., cell center) and 5% CDF being the farthest (e.g., cell edge). Dashed curves 906, 908, and 910 illustrates per-UE capacity of a conventional DCS with respect to 95%, 50%, and 5% CDF, respectively. Notably, the DCS 300 can achieve a higher per-UE capacity over the conventional DCS across different CDFs.

FIG. 9B illustrates total capacity improvements of the DCS 300. In FIG. 9B, solid curves 912, 914, and 916 represent total capacity achieved in the DCS 300 in the indoor building 500 of FIG. 5A with respect to 95%, 50%, and 5% CDF, respectively. Dashed curves 918, 920, and 922 illustrate total capacity of a conventional DCS with respect to 95%, 50%, and 5% CDF, respectively. Notably, the DCS 300 can achieve a higher total capacity over the conventional DCS across different CDFs. For example, with 10 UEs in the DCS 300, the mean capacity (e.g., 50% at CDF) increases by approximately 36%. When the number of UEs in the DCS 300 increases to 12, there is approximately 6% total capacity gain in the DCS 300. Therefore, the total capacity gain in the DCS 300 can be approximately 42%.

Figure 10A:
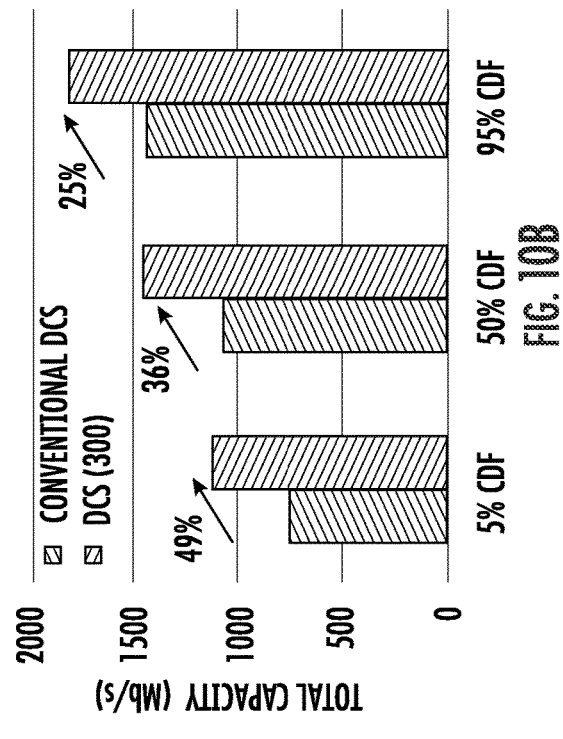
FIGS. 10A-10D are graphic diagrams providing further comparisons of per-UE and total capacity between the DCS of FIG. 3 and a conventional DCS.
Figure 10B:
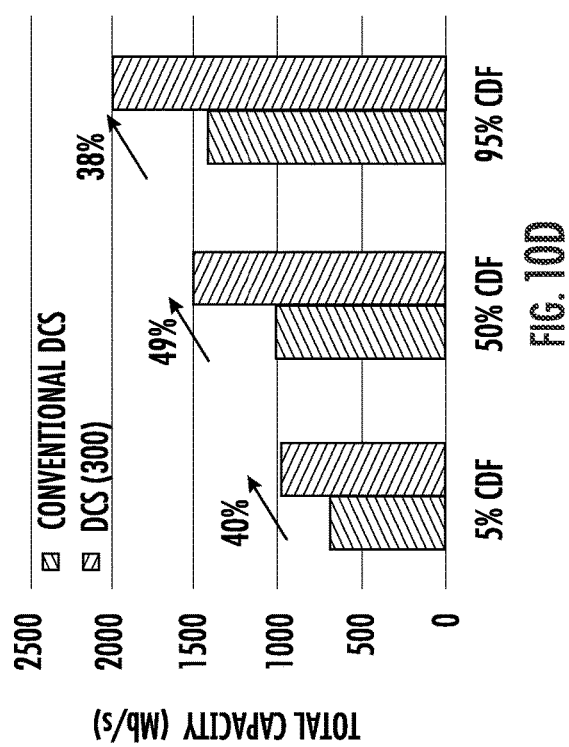
Figure 10C:
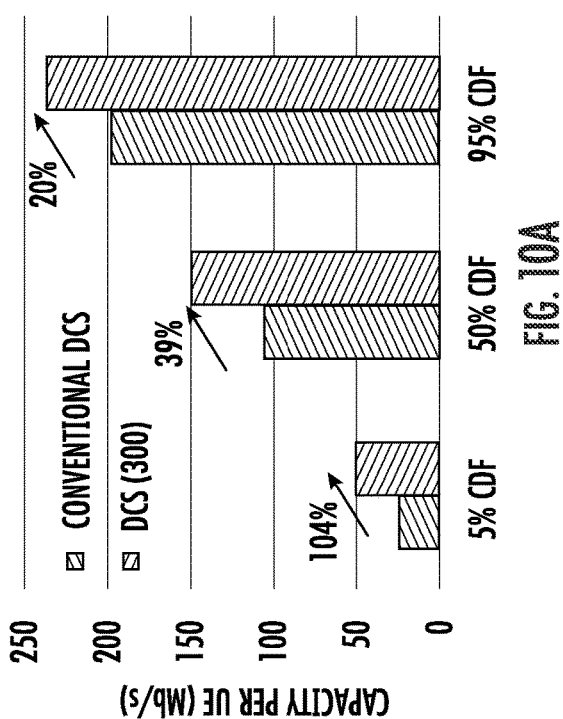
Figure 10D:
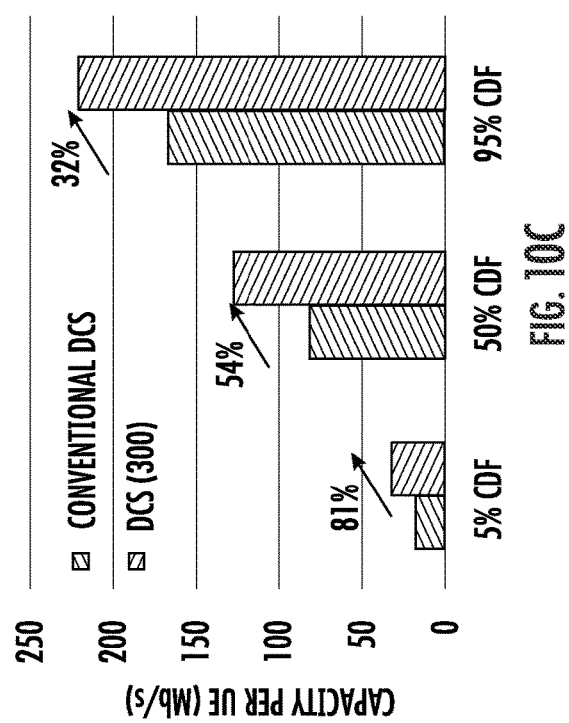

FIGS. 10A-10D are graphic diagrams providing further comparisons of per-UE and total capacity between the DCS 300 of FIG. 3 and a conventional DCS. Specifically, FIG. 10A illustrates a comparison of per-UE capacity with a total of 10 UEs. FIG. 10B illustrates a comparison of total capacity with a total of 10 UEs. FIG. 10C illustrates a comparison of per-UE capacity with a total of 12 UEs. FIG. 10D illustrates a comparison of total capacity with a total of 12 UEs. As shown in FIGS. 10A and 10C, the DCS 300 can achieve a significantly higher per-UE capacity improvement over the conventional DCS, especially on the cell edge (5% CDF) (81% to 104%).

Figure 11:
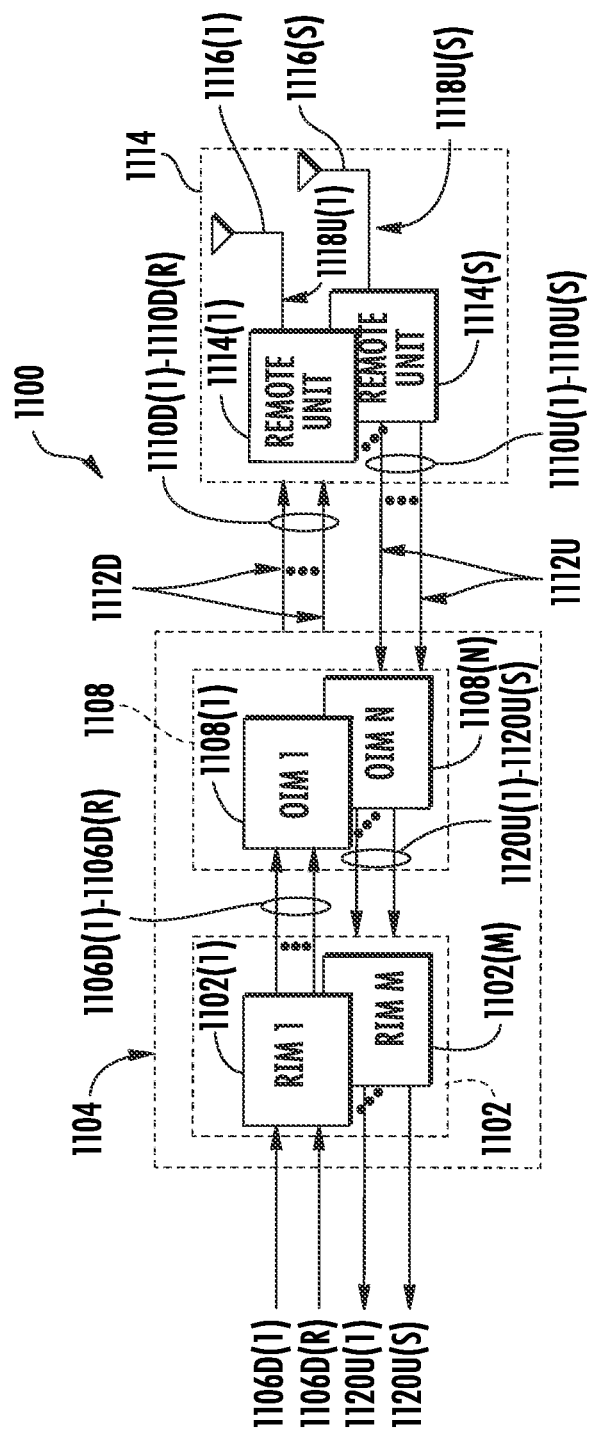
FIG. 11 is a schematic diagram of an exemplary WCS provided in the form of an optical fiber-based WCS, such as the DCS of FIG. 3 for supporting DM-MIMO.

FIG. 11 is a schematic diagram of an exemplary WCS 1100 provided in the form of an optical fiber-based WCS, such as the DCS 300 of FIGS. 3 and 5A for supporting DM-MIMO. The WCS 1100 includes an optical fiber for distributing communications services for multiple frequency bands. The WCS 1100 in this example is comprised of three (3) main components. A plurality of radio interfaces provided in the form of radio interface modules (RIMs) 1102(1)-1102(M) are provided in a central unit 1104 to receive and process a plurality of downlink communications signals 1106D(1)-1106D(R) prior to optical conversion into downlink optical fiber-based communications signals. The downlink communications signals 1106D(1)-1106D(R) may be received from a base station as an example. The RIMs 1102(1)-1102(M) provide both downlink and uplink interfaces for signal processing. The notations "1-R" and "1-M" indicate that any number of the referenced components, 1-R and 1-M, respectively, may be provided. The central unit 1104 is configured to accept the RIMS 1102(1)-1102(M) as modular components that can easily be installed and removed or replaced in the central unit 1104. In one example, the central unit 1104 is configured to support up to twelve (12) RIMs 1102(1)-1102(12). Each of the RIMs 1102(1)-1102(M) can be designed to support a particular type of radio source or range of radio sources (i.e., frequencies) to provide flexibility in configuring the central unit 1104 and the WCS 1100 to support the desired radio sources.

For example, one RIM 1102 may be configured to support the Personalized Communications System (PCS) radio band. Another RIM 1102 may be configured to support the 800 megahertz (MHz) radio band. In this example, by inclusion of the RIMs 1102(1)-1102(M), the central unit 1104 could be configured to support and distribute communications signals on both PCS and Long-Term Evolution (LTE) 700 radio bands, as an example. The RIMs 1102(1)-1102(M) may be provided in the central unit 1104 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UNITS). The RIMs 1102(1)-1102(M) may also be provided in the central unit 1104 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 1102(1)-1102(M) may be provided in the central unit 1104 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 11, the downlink communications signals 1106D(1)-1106D(R) are provided to a plurality of optical interfaces provided in the form of optical interface modules (OIMs) 1108(1)-1108(N) in this embodiment to convert the downlink communications signals 1106D(1)-1106D(R) into a plurality of downlink optical fiber-based communications signals 1110D(1)-1110D(R). The notation "1-N" indicates that any number of the referenced component 1-N may be provided. The OIMs 1108(1)-1108(N) may be configured to provide a plurality of optical interface components (OICs) that contain optical-to-electrical (O/E) and electrical-to-optical (E/O) converters, as will be described in more detail below. The OIMs 1108(1)-1108(N) support the radio bands that can be provided by the RIMs 1102(1)-1102(M), including the examples previously described above.

The OIMs 1108(1)-1108(N) each include E/O converters to convert the downlink communications signals 1106D(1)-1106D(R) into the downlink optical fiber-based communications signals 1110D(1)-1110D(R). The downlink optical fiber-based communications signals 1110D(1)-1110D(R) are communicated over a downlink optical fiber-based communications medium 1112D to a plurality of remote units 1114(1)-1114(S). The notation "1-S" indicates that any number of the referenced component 1-S may be provided. Remote unit O/E converters provided in the remote units 1114(1)-1114(S) convert the downlink optical fiber-based communications signals 1110D(1)-1110D(R) back into the downlink communications signals 1106D(1)-1106D(R), which are then converted into a plurality of downlink RF communications signals and provided to antennas 1116(1)-1116(S) in the remote units 1114(1)-1114(S) to client devices in the reception range of the antennas 1116(1)-1116(S).

The remote units 1114(1)-1114(S) receive a plurality of uplink RF communications signals from the client devices through the antennas 1116(1)-1116(S). The remote units 1114(1)-1114(S) convert the uplink RF communications signals into a plurality of uplink communications signals 1118U(1)-1118U(S). Remote unit E/O converters are also provided in the remote units 1114(1)-1114(S) to convert the uplink communications signals 1118U(1)-1118U(S) into a plurality of uplink optical fiber-based communications signals 1110U(1)-1110U(S). The remote units 1114(1)-1114(S) communicate the uplink optical fiber-based communications signals 1110U(1)-1110U(S) over an uplink optical fiber-based communications medium 1112U to the OIMs 1108(1)-1108(N) in the central unit 1104. The OIMs 1108(1)-1108(N) include O/E converters that convert the received uplink optical fiber-based communications signals 1110U(1)-1110U(S) into a plurality of uplink communications signals 1120U(1)-1120U(S), which are processed by the RIMs 1102(1)-1102(M) and provided as the uplink communications signals 1120U(1)-1120U(S). The central unit 1104 may provide the uplink communications signals 1120U(1)-1120U(S) to a base station or other communications system.

Note that the downlink optical fiber-based communications medium 1112D and the uplink optical fiber-based communications medium 1112U connected to each of the remote units 1114(1)-1114(S) may be a common optical fiber-based communications medium, wherein for example, wave division multiplexing (WDM) is employed to provide the downlink optical fiber-based communications signals 1110D(1)-1110D(R) and the uplink optical fiber-based communications signals 1110U(1)-1110U(S) on the same optical fiber-based communications medium.

Figure 12:
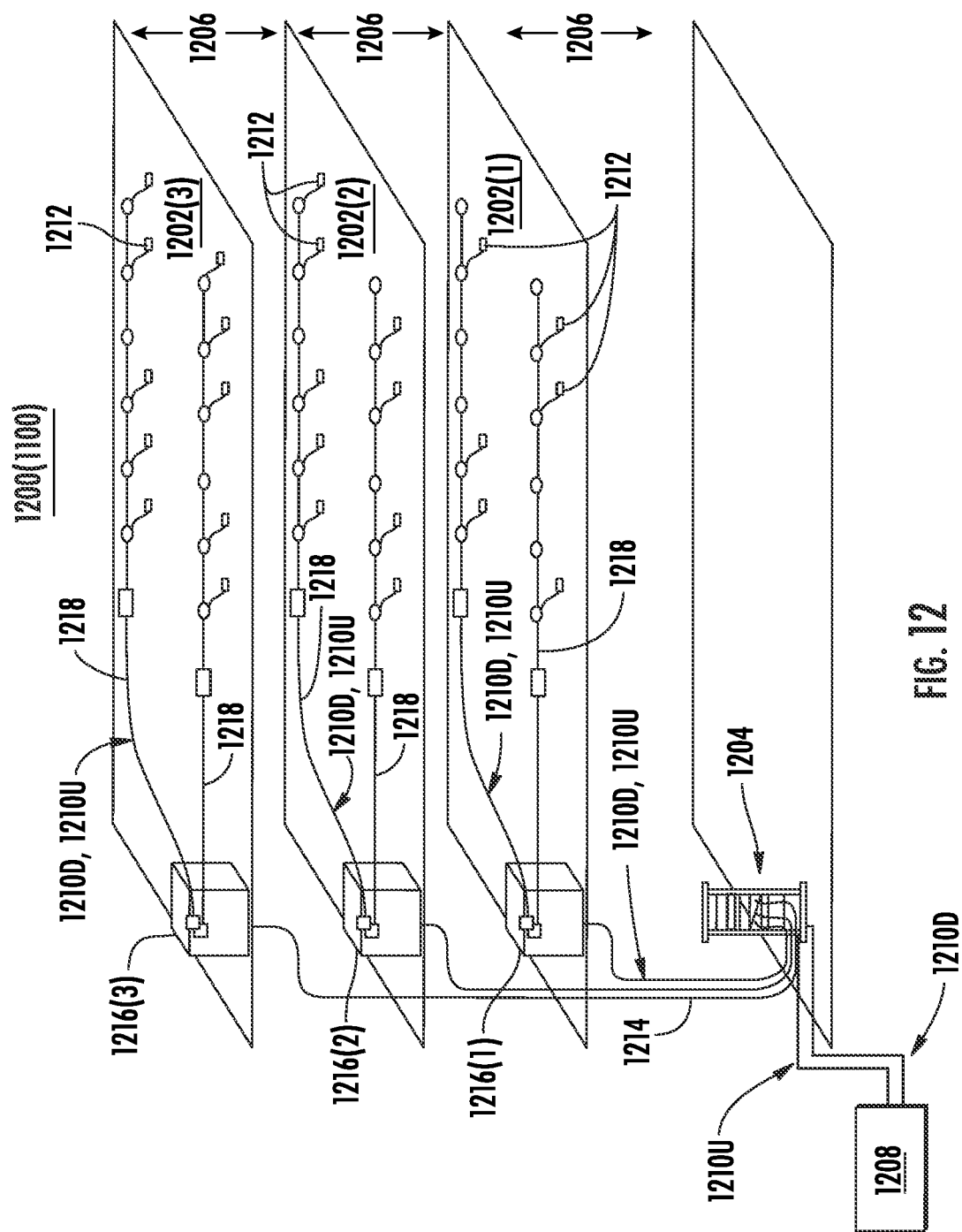
FIG. 12 is a partial schematic cut-away diagram of an exemplary building infrastructure in a WCS, such as the WCS of FIG. 11.

The WCS 1100 in FIG. 11 can be provided in an indoor environment as illustrated in FIG. 12. FIG. 12 is a partial schematic cut-away diagram of an exemplary building infrastructure 1200 in a WCS, such as the WCS 1100 of FIG. 11. The building infrastructure 1200 in this embodiment includes a first (ground) floor 1202(1), a second floor 1202(2), and a third floor 1202(3). The floors 1202(1)-1202(3) are serviced by a central unit 1204 to provide antenna coverage areas 1206 in the building infrastructure 1200. The central unit 1204 is communicatively coupled to a base station 1208 to receive downlink communications signals 1210D from the base station 1208. The central unit 1204 is communicatively coupled to a plurality of remote units 1212 to distribute the downlink communications signals 1210D to the remote units 1212 and to receive uplink communications signals 1210U from the remote units 1212, as previously discussed above. The downlink communications signals 1210D and the uplink communications signals 1210U communicated between the central unit 1204 and the remote units 1212 are carried over a riser cable 1214. The riser cable 1214 may be routed through interconnect units (ICUs) 1216(1)-1216(3) dedicated to each of the floors 1202(1)-1202(3) that route the downlink communications signals 1210D and the uplink communications signals 1210U to the remote units 1212 and also provide power to the remote units 1212 via array cables 1218.

Figure 13:
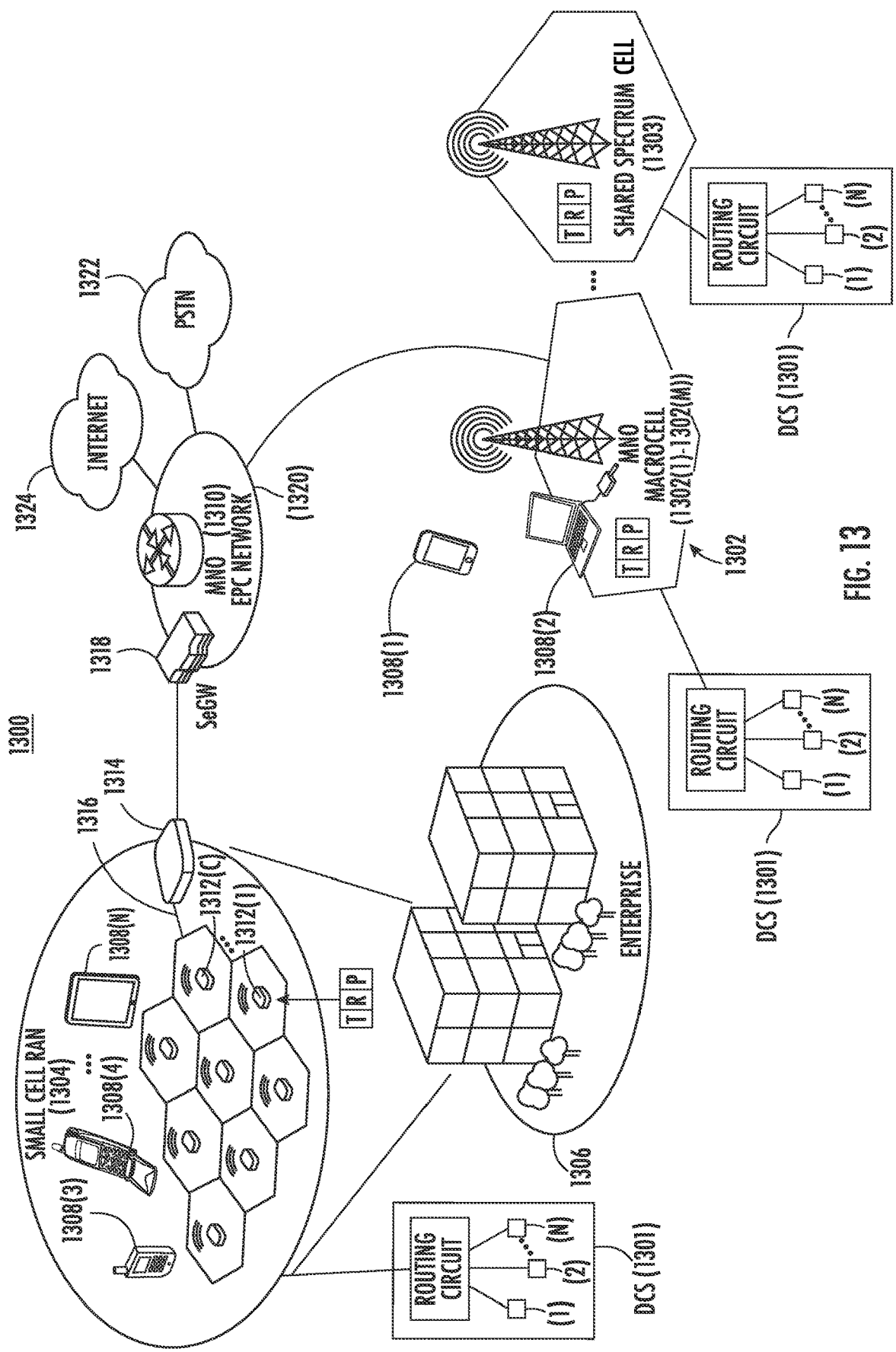
FIG. 13 is a schematic diagram of an exemplary mobile telecommunications environment that can includes the DCS of FIG. 3 for supporting DM-MIMO.

The DCS 300 of FIGS. 3 and 5A configured to support DM-MIMO can also be interfaced with different types of radio nodes of service providers and/or supporting service providers, including macrocell systems, small cell systems, and remote radio heads (RRH) systems, as examples. For example, FIG. 13 is a schematic diagram of an exemplary mobile telecommunications environment 1300 (also referred to as "environment 1300") that includes radio nodes and cells that may support shared spectrum, such as unlicensed spectrum, and can be interfaced to shared spectrum DCSs 1301 supporting coordination of distribution of shared spectrum from multiple service providers to remote units to be distributed to subscriber devices. The shared spectrum DCSs 1301 can include the DCS 300 of FIGS. 3 and 5A, as an example.

The environment 1300 includes exemplary macrocell RANs 1302(1)-1302(M) ("macrocells 1302(1)-1302(M)") and an exemplary small cell RAN 1304 located within an enterprise environment 1306 and configured to service mobile communications between a user mobile communications device 1308(1)-1308(N) to a mobile network operator (MNO) 1310. A serving RAN for the user mobile communications devices 1308(1)-1308(N) is a RAN or cell in the RAN in which the user mobile communications devices 1308(1)-1308(N) have an established communications session with the exchange of mobile communications signals for mobile communications. Thus, a serving RAN may also be referred to herein as a serving cell. For example, the user mobile communications devices 1308(3)-1308(N) in FIG. 13 are being serviced by the small cell RAN 1304, whereas the user mobile communications devices 1308(1) and 1308(2) are being serviced by the macrocell 1302. The macrocell 1302 is an MNO macrocell in this example. However, a shared spectrum RAN 1303 (also referred to as "shared spectrum cell 1303") includes a macrocell in this example and supports communications on frequencies that are not solely licensed to a particular MNO, such as CBRS for example, and thus may service user mobile communications devices 1308(1)-1308(N) independent of a particular MNO. For example, the shared spectrum cell 1303 may be operated by a third party that is not an MNO and wherein the shared spectrum cell 1303 supports CBRS. Also, as shown in FIG. 13, the MNO macrocell 1302, the shared spectrum cell 1303, and/or the small cell RAN 1304 can interface with a shared spectrum DCS 1301 supporting coordination of distribution of shared spectrum from multiple service providers to remote units to be distributed to subscriber devices. The MNO macrocell 1302, the shared spectrum cell 1303, and the small cell RAN 1304 may be neighboring radio access systems to each other, meaning that some or all can be in proximity to each other such that a user mobile communications device 1308(3)-1308(N) may be able to be in communications range of two or more of the MNO macrocell 1302, the shared spectrum cell 1303, and the small cell RAN 1304 depending on the location of the user mobile communications devices 1308(3)-1308(N).

In FIG. 13, the mobile telecommunications environment 1300 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1300 includes the enterprise environment 1306 in which the small cell RAN 1304 is implemented. The small cell RAN 1304 includes a plurality of small cell radio nodes 1312(1)-1312(C). Each small cell radio node 1312(1)-1312(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 13, the small cell RAN 1304 includes one or more services nodes (represented as a single services node 1314) that manage and control the small cell radio nodes 1312(1)-1312(C). In alternative implementations, the management and control functionality may be incorporated into a radio node, distributed among nodes, or implemented remotely (i.e., using infrastructure external to the small cell RAN 1304). The small cell radio nodes 1312(1)-1312(C) are coupled to the services node 1314 over a direct or local area network (LAN) connection 1316 as an example, typically using secure IPsec tunnels. The small cell radio nodes 1312(1)-1312(C) can include multi-operator radio nodes. The services node 1314 aggregates voice and data traffic from the small cell radio nodes 1312(1)-1312(C) and provides connectivity over an IPsec tunnel to a security gateway (SeGW) 1318 in a network 1320 (e.g, evolved packet core (EPC) network in a 4G network, or 5G Core in a 5G network) of the MNO 1310. The network 1320 is typically configured to communicate with a public switched telephone network (PSTN) 1322 to carry circuit-switched traffic, as well as for communicating with an external packet-switched network such as the Internet 1324.

The environment 1300 also generally includes a node (e.g., eNodeB or gNodeB) base station, or "macrocell" 1302. The radio coverage area of the macrocell 1302 is typically much larger than that of a small cell where the extent of coverage often depends on the base station configuration and surrounding geography. Thus, a given user mobile communications device 1308(3)-1308(N) may achieve connectivity to the network 1320 (e.g., EPC network in a 4G network, or 5G Core in a 5G network) through either a macrocell 1302 or small cell radio node 1312(1)-1312(C) in the small cell RAN 1304 in the environment 1300.

Figure 14:
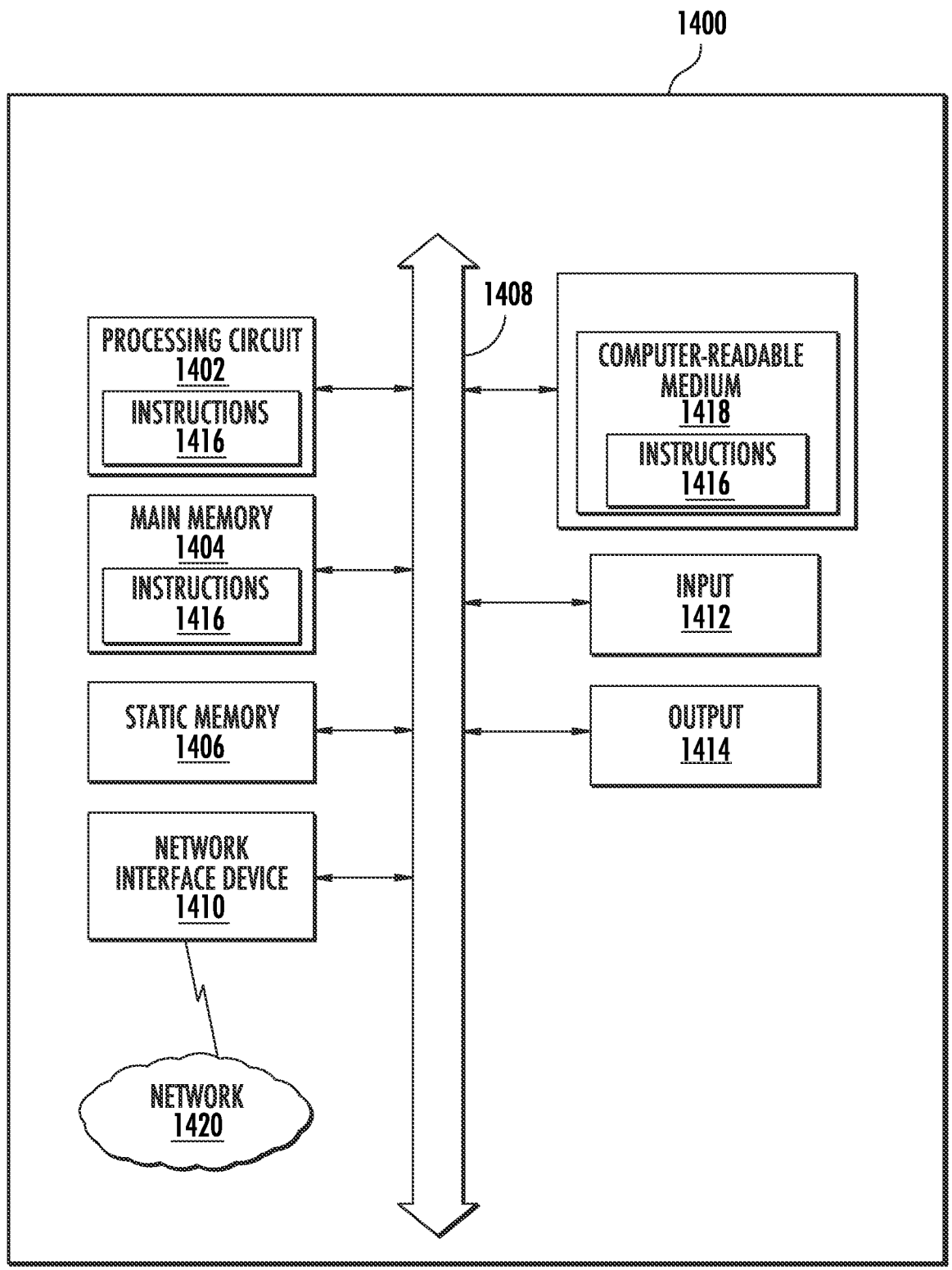
FIG. 14 is a schematic diagram of a representation of an exemplary computer system that can be included in or interfaced with any of the components in the DCS of FIG. 3 for supporting DM-MIMO, wherein the exemplary computer system is configured to execute instructions from an exemplary computer-readable medium.

Any of the circuits in the DCS 300 of FIGS. 3 and 5A, such as the control circuit 322 and/or the remote units 304(1)-304(N), can include a computer system 1400, such as that shown in FIG. 14, to carry out their functions and operations. With reference to FIG. 14, the computer system 1400 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1400 in this embodiment includes a processing circuit or processor 1402, a main memory 1404 (e.g., read-only memory (ROM), flash memory, dynamic random access memory (DRAM) such as synchronous DRAM (SDRAM), etc.), and a static memory 1406 (e.g., flash memory, static random access memory (SRAM), etc.), which may communicate with each other via a data bus 1408. Alternatively, the processing circuit 1402 may be connected to the main memory 1404 and/or static memory 1406 directly or via some other connectivity means. The processing circuit 1402 may be a controller, and the main memory 1404 or static memory 1406 may be any type of memory.

The processing circuit 1402 represents one or more general-purpose processing circuits such as a microprocessor, central processing unit, or the like. More particularly, the processing circuit 1402 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1402 is configured to execute processing logic in instructions 1416 for performing the operations and steps discussed herein.

The computer system 1400 may further include a network interface device 1410. The computer system 1400 also may or may not include an input 1412 to receive input and selections to be communicated to the computer system 1400 when executing instructions. The computer system 1400 also may or may not include an output 1414, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processing circuit 1402 during execution thereof by the computer system 1400, the main memory 1404 and the processing circuit 1402 also constituting the computer-readable medium 1418. The instructions 1416 may further be transmitted or received over a network 1420 via the network interface device 1410.

While the computer-readable medium 1418 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents

We claim:

1. A distributed communications system (DCS), comprising:
   a plurality of remote units configured to communicate downlink and uplink radio frequency (RF) communications signals with a plurality of user equipment (UEs) at a plurality of UE locations in the DCS, the plurality of remote units each comprising:
      a plurality of RF chains configured to:
         receive a plurality of downlink digital communications signals, respectively; and
         convert the plurality of downlink digital communications signals into a plurality of downlink RF communications signals, respectively;
      a plurality of antennas each configured to be an active antenna or an inactive antenna, wherein a number of the plurality of antennas is more than a number of the plurality of RF chains; and
      an RF switch circuit configured to couple the plurality of RF chains to a subset of the plurality of antennas in accordance to the plurality of UE locations to activate the subset of the plurality of antennas to concurrently radiate the plurality of downlink RF communications signals.

2. The DCS of claim 1, wherein each of the plurality of remote units is further configured to communicate the downlink and uplink RF communications signals based on a spatial multiplexing scheme.

3. The DCS of claim 1, wherein, in each of the plurality of remote units:
   the subset of the plurality of antennas is further configured to concurrently absorb a plurality of uplink RF communications signals; and
   the plurality of RF chains is further configured to convert the plurality of uplink RF communications signals into a plurality of uplink digital communications signals, respectively.

4. The DCS of claim 3, further comprising a routing circuit coupled to the plurality of remote units via a plurality of fronthaul links, the routing circuit is configured to:
   provide the plurality of downlink digital communications signals to each of the plurality of remote units via a respective one of the plurality of fronthaul links; and
   receive the plurality of uplink digital communications signals from each of the plurality of remote units via the respective one of the plurality of fronthaul links.

5. The DCS of claim 4, further comprising a signal source circuit coupled to the routing circuit, the signal source circuit is configured to:
   determine the subset of the plurality of antennas in each of the plurality of remote units based on the plurality of UE locations; and
   control the RF switch circuit in each of the plurality of remote units to couple the plurality of RF chains to the subset of the plurality of antennas to activate the subset of the plurality of antennas.

6. The DCS of claim 5, wherein the signal source circuit comprises a baseband unit (BBU) coupled to the routing circuit via a common public radio interface (CPRI).

7. The DCS of claim 5, wherein the signal source circuit is further configured to control the RF switch circuit in each of the plurality of remote units via a dedicated control signal.

8. The DCS of claim 5, wherein the signal source circuit comprises a control circuit configured to:
   determine the plurality of UE locations of the plurality of UEs in the DCS;
   determine the subset of the plurality of antennas to be activated in each of the plurality of remote units based on the plurality of UE locations; and
   control the RF switch circuit in each of the plurality of remote units to couple the plurality of RF chains to the subset of the plurality of antennas to activate the subset of the plurality of antennas.

9. The DCS of claim 8, wherein the control circuit is further configured to load a reference database comprising a plurality of rows and a plurality of columns, wherein:
   the plurality of rows each represents a respective antenna among the plurality of antennas comprised in each of the plurality of remote units;
   the plurality of columns each represents a respective location among a plurality of predefined locations in the DCS; and
   each cross point between the plurality of rows and the plurality of columns comprises a channel amplitude response that is expected from the respective antenna represented by a respective one of the plurality of rows at the respective location represented by a respective one of the plurality of columns.

10. The DCS of claim 9, wherein the reference database is predetermined by measuring an RF power radiated from the plurality of antennas in each of the plurality of remote units at each of the plurality of predefined locations in the DCS.

11. The DCS of claim 9, wherein the control circuit is further configured to generate a reduced reference database comprising a subset of the plurality of rows and the plurality of columns, wherein the subset of the plurality of rows each correspond to a respective active antenna among the subset of the plurality of antennas activated in each of the plurality of remote units.

12. The DCS of claim 11, wherein the control circuit is further configured to, for each of the plurality of UEs:
   receive a channel information vector comprising a plurality of power measurements corresponding to the subset of the plurality of antennas activated in each of the plurality of remote units;
   convert the channel amplitude response in each of the subset of the plurality of rows and each of the plurality of columns in the reduced reference database into respective decibel (dB) terms;
   convert the plurality of power measurements in the channel information vector into respective dB terms;
   identify one of the plurality of columns in the reduced reference database having a minimum square error from the channel information vector; and
   determine a respective one of the plurality of UE locations to be the respective location represented by the one of the plurality of columns in the reduced reference database.

13. The DCS of claim 9, wherein the control circuit is further configured to determine a total number of active antennas in the DCS to be equal to a sum of the plurality of RF chains in all of the plurality of remote units.

14. The DCS of claim 13, wherein the control circuit is further configured to:
determine a first subset of the total number of active antennas by selecting one or more antennas among the plurality of antennas in each of the plurality of remote units that provide a highest power to one or more of the plurality of UEs at one or more of the plurality of UE locations; and
determine a second subset of the total number of active antennas by selecting other one or more antennas among the plurality of antennas in each of the plurality of remote units that meet the following conditions:
not selected for the first subset of the total number of active antennas; and
provide a highest power to the one or more of the plurality of UEs at the one or more of the plurality of UE locations.

15. The DCS of claim 14, wherein the control circuit is further configured to:
determine a total power received from one of more of the plurality of antennas that are not among the first subset of the total number of active antennas at each of the one or more of the plurality of UE locations;
order the one or more of the plurality of UE locations in an ascending order based on the total power received at the one or more of the plurality of UE locations; and
determine the other one or more antennas in the second subset of the total number of active antennas that provide the highest power at the one or more of the plurality of UE locations in accordance to the ascending order.

16. A method for supporting distributed massive multiple-input multiple-output (DM-MIMO) in a distributed communications system (DCS), comprising:
in each of a plurality of remote units configured to communicate downlink and uplink radio frequency (RF) communications signals with a plurality of user equipment (UEs) at a plurality of UE locations in the DCS:
providing a plurality of antennas each configured to be an active antenna or an inactive antenna;
receiving a plurality of downlink digital communications signals via a plurality of RF chains, wherein a number of the plurality of antennas is more than a number of the plurality of RF chains;
converting the plurality of downlink digital communications signals into a plurality of downlink RF communications signals, respectively; and
coupling the plurality of RF chains to a subset of the plurality of antennas in accordance to the plurality of UE locations in the DCS to activate the subset of the plurality of antennas to concurrently radiate the plurality of downlink RF communications signals.

17. The method of claim 16, further comprising:
communicating the downlink and uplink RF communications signals based on a spatial multiplexing scheme; and
in each of the plurality of remote units:
concurrently absorbing a plurality of uplink RF communications signals; and
converting the plurality of uplink RF communications signals into a plurality of uplink digital communications signals, respectively.

18. The method of claim 17, further comprising:
determining the subset of the plurality of antennas in each of the plurality of remote units based on the plurality of UE locations; and
controlling an RF switch circuit in each of the plurality of remote units to couple the plurality of RF chains to the subset of the plurality of antennas to activate the subset of the plurality of antennas.

19. The method of claim 18, further comprising loading a reference database comprising a plurality of rows and a plurality of columns, wherein:
the plurality of rows each represents a respective antenna among the plurality of antennas comprised in each of the plurality of remote units;
the plurality of columns each represents a respective location among a plurality of predefined locations in the DCS; and
each cross point between the plurality of rows and the plurality of columns comprises a channel amplitude response that is expected from the respective antenna represented by a respective one of the plurality of rows at the respective location represented by a respective one of the plurality of columns.

20. The method of claim 19, further comprising predetermining the reference database by measuring an RF power radiated from the plurality of antennas in each of the plurality of remote units at each of the plurality of predefined locations in the DCS.

21. The method of claim 19, further comprising generating a reduced reference database comprising a subset of the plurality of rows and the plurality of columns, wherein the subset of the plurality of rows each correspond to a respective active antenna among the subset of the plurality of antennas activated in each of the plurality of remote units.

22. The method of claim 21, further comprising, for each of the plurality of UEs:
receiving a channel information vector comprising a plurality of power measurements corresponding to the subset of the plurality of antennas activated in each of the plurality of remote units;
converting the channel amplitude response in each of the subset of the plurality of rows and each of the plurality of columns in the reduced reference database into respective decibel (dB) terms;
converting the plurality of power measurements in the channel information vector into respective dB terms;
identifying one of the plurality of columns in the reduced reference database having a minimum square error from the channel information vector; and
determining a respective one of the plurality of UE locations to be the respective location represented by the one of the plurality of columns in the reduced reference database.

23. The method of claim 19, further comprising:
determining a total number of active antennas in the DCS to be equal to a sum of the plurality of RF chains in all of the plurality of remote units;
determining a first subset of the total number of active antennas by selecting one or more antennas among the plurality of antennas in each of the plurality of remote units that provide a highest power to one or more of the plurality of UEs at one or more of the plurality of UE locations; and
determining a second subset of the total number of active antennas by selecting other one or more antennas among the plurality of antennas in each of the plurality of remote units that meet following conditions:

not selected for the first subset of the total number of active antennas; and provide a highest power to the one or more of the plurality of UEs at the one or more of the plurality of UE locations.

24. The method of claim 23, further comprising:

determining a total power received from one of more of the plurality of antennas that are not among the first subset of the total number of active antennas at each of the one or more of the plurality of UE locations;

ordering the one or more of the plurality of UE locations in an ascending order based on the total power received at the one or more of the plurality of UE locations; and determining the other one or more antennas in the second subset of the total number of active antennas that provide the highest power at the one or more of the plurality of UE locations in accordance to the ascending order.

* * * * *